United States Patent
Lee et al.

(10) Patent No.: US 10,185,584 B2
(45) Date of Patent: Jan. 22, 2019

(54) SYSTEM AND METHOD FOR SELF-PROTECTING DATA

(71) Applicant: Teleputers, LLC, Princeton, NJ (US)

(72) Inventors: Ruby B. Lee, Princeton, NJ (US); Pramod A. Jamkhedkar, Bridgewater, NJ (US); Yu-Yuan Chen, Chandler, AZ (US)

(73) Assignee: Teleputers, LLC, Princeton, NJ (US)

( * ) Notice: Subject to any disclaimer, the term of this patent is extended or adjusted under 35 U.S.C. 154(b) by 527 days.

(21) Appl. No.: 14/464,553

(22) Filed: Aug. 20, 2014

(65) Prior Publication Data

US 2015/0058997 A1    Feb. 26, 2015

Related U.S. Application Data

(60) Provisional application No. 61/867,669, filed on Aug. 20, 2013.

(51) Int. Cl.
　　*G06F 17/30*　　(2006.01)
　　*G06F 9/455*　　(2018.01)
　　*G06F 21/62*　　(2013.01)

(52) U.S. Cl.
　　CPC ...... *G06F 9/45558* (2013.01); *G06F 21/6227* (2013.01); *G06F 21/6281* (2013.01); *G06F 2009/45583* (2013.01)

(58) Field of Classification Search
　　CPC ............. G06F 9/45558; G06F 21/6227; G06F 21/6281; G06F 2009/45583
(Continued)

(56) References Cited

U.S. PATENT DOCUMENTS 6,697,948 B1 *  2/2004  Rabin ............. G06F 21/10
　　　　　　　　　　　　　　　　　　　　705/52
7,406,593 B2 *  7/2008  Rabin ............. G06F 21/10
　　　　　　　　　　　　　　　　　　　　380/201
(Continued)

OTHER PUBLICATIONS

A. Sabelfeld et al., "Language-Based Information-Flow Security," IEEE Journal on Selected Areas in Communications, 21(1):5-19, Jan. 2003. (15 pages).
(Continued)

*Primary Examiner* — Thu Ha T Nguyen
(74) *Attorney, Agent, or Firm* — McCarter & English, LLP

(57) ABSTRACT

Disclosed is a system comprising a physical memory, a processor and a software component. The software component includes a policy/domain handler for receiving data and a policy associated with the data; a hypervisor; and a file management module. The file management module receives a request from a third-party application to interact with a data file containing the data; sends an authorization and tag request to the policy/domain handler to check if the user and application are permitted to access the data, and if permitted, to generate hardware tags for the data file; and sends a secure data request to the hypervisor to create a secure data compartment for the data file and the hardware tags. Based on the authorization and tag request, and the security policy associated with the data, the policy/domain handler generates the hardware tags for the data file. Based on the secure data request, the hypervisor creates in the physical memory a secure data compartment containing the data file and the hardware tags, the hypervisor associating the hardware tags with the data in the secure data compartment. As the data is operated upon and moved to other memory areas, the hardware tags are propagated with the data according to tag
(Continued)

propagation rules, and checked before performing operations that may lead to security breaches.

36 Claims, 35 Drawing Sheets

(58) Field of Classification Search
USPC .............................................. 726/26, 25, 30
See application file for complete search history.

(56) References Cited

U.S. PATENT DOCUMENTS

| | | | | |
|---|---|---|---|---|
| 7,580,988 | B2* | 8/2009 | Rudd | G06F 21/6209 709/217 |
| 7,827,598 | B2* | 11/2010 | Moran | G06F 21/6218 713/166 |
| 8,677,505 | B2* | 3/2014 | Redlich | G06F 21/577 713/166 |
| 8,745,205 | B2* | 6/2014 | Anderson | H04L 9/3213 709/224 |
| 9,043,605 | B1* | 5/2015 | MacHani | G06F 21/35 713/185 |
| 9,213,836 | B2* | 12/2015 | Mayer | G06F 21/56 |
| 9,784,260 | B2* | 10/2017 | Lee | F04B 33/00 |
| 9,787,639 | B1* | 10/2017 | Sun | H04L 63/0245 |
| 9,819,647 | B2* | 11/2017 | Reddy | H04L 63/0428 |
| 2007/0204329 | A1* | 8/2007 | Peckover | G06F 21/10 726/3 |
| 2009/0037682 | A1* | 2/2009 | Armstrong | G06F 12/1475 711/164 |
| 2009/0172644 | A1* | 7/2009 | Nagarajan | G06F 8/33 717/128 |
| 2010/0281273 | A1* | 11/2010 | Lee | G06F 21/72 713/190 |
| 2011/0277038 | A1* | 11/2011 | Sahita | G06F 21/6281 726/27 |
| 2012/0163388 | A1* | 6/2012 | Goel | H04L 12/4641 370/395.53 |
| 2012/0173870 | A1* | 7/2012 | Reddy | H04L 63/0428 713/153 |
| 2014/0047549 | A1* | 2/2014 | Bostley, III | G06F 21/60 726/26 |
| 2014/0052877 | A1* | 2/2014 | Mao | H04L 61/103 709/245 |
| 2014/0164624 | A1* | 6/2014 | Ames | G06F 9/45558 709/226 |
| 2014/0337914 | A1* | 11/2014 | Canning | H04L 63/10 726/1 |
| 2015/0058627 | A1* | 2/2015 | Paffel | G16H 10/60 713/168 |
| 2017/0134422 | A1* | 5/2017 | Shieh | H04L 63/1491 |

OTHER PUBLICATIONS

N. Zeldovich et al., "Making Information Flow Explicit in HiStar," OSDI '06, pp. 263-278, 2006. (16 pages).

F. Qin et al., "LIFT: A Low-Overhead Practical Information Flow Tracking System for Detecting Security Attacks," Micro 06, pp. 135-148, 2006. (12 pages).

N. Vachharajani et al., "RIFLE: An Architectural Framework for User-Centric Information-Flow Security," MICRO '04, pp. 243-254, 2004. (12 pages).

M. Dalton et al., "Raksha: A Flexible Information Flow Architecture for Software Security," ISCA '07, pp. 482-493, 2007. (12 pages).

M. Tiwari et al., "Complete Information Flow Tracking from the Gates Up," ASPLOS '09, pp. 109-120, 2009. (12 pages).

* cited by examiner

```
1: src[337], k=4000, p, q, t=1000, n=0, dst[1100];
2: for(;src[j=q=0]+=2, --k;)
3:     for(p=1+2*k; j<337; q=F(src[j], k, q, p, t), src[j++]=q/p)
4:         if(G(k, j))
5:             n+=sprintf(&dst[n], "%.3d", taint=H(src[j-2], t, q, p))
6: printf("%s", &dst[0]);
```

```
sprintf (buffer, format, number) {
    ⋮
    while (number != 0)
    {
        digit = number % 10;
        number /= 10;
            switch (digit)
            {
                case 0: character = '0' ; break;
                case 1: character = '1' ; break;
                ⋮
            }
            buffer[cnt++] = character;
    }
    ⋮
}
```

FIG. 18

```
 3: 104f8:  10 80 00 28  b    10598
 4: 104fc:  01 00 00 00  nop
 5: 10500:  c6 07 bf e4  ld   number, %g3
 6: 10504:  85 38 e0 1f  sra  %g3, 0x1f, %g2
 7: 10508:  81 80 a0 00  mov  %g2, %y
 8: 10518:  82 78 e0 0a  sdiv %g3, 0xa, %g1
 9: 1051c:  82 00 40 01  add  %g1, %g1, %g1
10: 10520:  85 28 60 02  sll  %g1, 2, %g2
11: 10524:  82 00 40 02  add  %g1, %g2, %g1
12: 10528:  82 20 c0 01  sub  %g3, %g1, %g1
13: 1052c:  c2 27 bf e8  st   %g1, digit       ; explicit information flow
                                                ; from number to digit
14: 10530:  c2 07 bf e4  ld   number, %g1
15: 10534:  85 38 60 1f  sra  %g1, 0x1f, %g2
16: 10538:  81 80 a0 00  mov  %g2, %y
17: 10548:  82 78 60 0a  sdiv %g1, 0xa, %g1
18: 1054c:  c2 27 bf e4  st   %g1, number
19: 10550:  c2 07 bf e8  ld   digit, %g1
20: 10554:  c2 27 bf dc  st   %g1, digit
21: 10558:  c4 07 bf dc  ld   digit, %g2
22: 1055c:  80 a0 a0 00  cmp  %g2, 0           ; test if digit = 0
23: 10560:  02 80 00 08  be   10580            ; tagged branch
24: 10564:  01 00 00 00  nop
25: 10568:  c2 07 bf dc  ld   digit, %g1
26: 1056c:  80 a0 60 01  cmp  %g1, 1           ; test if digit = 1
27: 10570:  02 80 00 08  be   10590            ; tagged branch
28: 10574:  01 00 00 00  nop
             . . . . .                          ; test if digit = 2, 3, etc.
29: 10578:  10 80 00 08  b    10598
30: 1057c:  01 00 00 00  nop
31: 10580:  82 10 20 30  mov  0x30, %g1
32: 10584:  c2 2f bf ef  stb  %g1, character   ; character = '0'
33: 10588:  10 80 00 04  b    10598
34: 1058c:  01 00 00 00  nop
35: 10590:  82 10 20 31  mov  0x31, %g1
36: 10594:  c2 2f bf ef  stb  %g1, character   ; character = '1'
37: 10588:  10 80 00 04  b    10598
38: 1058c:  01 00 00 00  nop
             . . . . .                          ; character = '2', '3', etc.
39: 10598:  c2 07 bf e4  ld   number, %g1
40: 1059c:  80 a0 60 00  cmp  %g1, 0           ; check end of while loop
41: 105a0:  12 bf ff d8  bne  10500            ; tagged branch
```

FIG. 19

| | Exp. High-Level Policy | Auto. Trans. of SW Policy | Unmod. App. | Runtime Data Tracking | Output Ctrl. | New HW |
|---|---|---|---|---|---|---|
| Language-based [23] | ✓ | | | | | |
| HiStar [33] | ✓ | | | | ✓ | |
| LIFT [22] | | | ✓ | ✓ | | |
| RIFLE [29] | ✓ | | | ✓ | | ✓ |
| Raksha [7] | ✓ (Limited) | | ✓ | ✓ | | ✓ |
| GLIFT [27] | ✓ | | | ✓ | | ✓ |
| Bastion [3] | ✓ | | | | ✓ | ✓ |
| DataSafe | ✓ | ✓ | ✓ | ✓ | ✓ | ✓ |

FIG. 26

| Actions | Category | Restriction | Tag |
|---|---|---|---|
| Edit | Access | No Write to SDC | 0x08 |
| Append | Access | No Extensible SDC | 0x10 |
| Read | Access | No Read from SDC | 0x20 |
| View | Transient Output | No Copy to Display | 0x01 |
| Send Plaintext | Persistent Output | No Copy to Network | 0x02 |
| Save Plaintext | Persistent Output | No Copy to Disk | 0x04 |

FIG. 27

Context Variables:
  sec_clear ∈ {Top Secret, Secret, Confidential, Unclassified}
  sec_class ∈ {Top Secret, Secret, Confidential, Unclassified}

Action to Tags Map:
  read ⇒ {No copy to display, No read}
  write ⇒ {No write to SDC, No append to SDC}
  leak data (implicit) ⇒ {No copy to disk, No copy to network}

BLP Policy:
  $ra_1$ := {action := read,  constraint := sec_class ≤ sec_clear},
  $ra_2$ = {action := write,  constraint := sec_class ≥ sec_clear}

Use Case1: sec_clear := Secret, sec_class := Confidential
Actions permitted: {read}
Actions prohibited: {write, leak data}
Tags set: {No write to SDC, No append to SDC, No copy to disk, No copy to network}

Use Case2: sec_clear := Secret, sec_class := Top Secret
Actions permitted: {write}
Actions prohibited: {read, leak data}
Tags set: {No read, No copy to display, No copy to disk, No copy to network}

Action to Tags Map (Extended BLP):
  read ⇒ {No read}
  view ⇒ {No copy to display}
  write ⇒ {No write to SDC, No append to SDC}
  prevent leakage ⇒ {No copy to disk, No copy to network}

FIG. 28

| ID | Virtual addr | Machine addr | Size | Tag |
|---|---|---|---|---|
| id1 | vaddr1 | maddr1 | size1 | 0×08 |
| id2 | vaddr2 | maddr2 | size2 | 0×1C |

FIG. 29

| Start addr | End addr | Mask |
|---|---|---|
| addr1 | addr2 | Display |
| addr3 | addr4 | Disk |

FIG. 30

| | |
|---|---|
| open_file | Open an existing DataSafe protected file. |
| close_file | Close an open DataSafe protected file. |
| read_file | Read from an open DataSafe protected file. |
| write_file | Write to an open DataSafe protected file. |

FIG. 31

| | |
|---|---|
| sdc_add (addr, size) | Adds a new SDC Protecting Policy-encoded data starting at virtual address addr with size size |
| sdc_del (sdcid) | Deletes an existing SDC with ID = sdcid |
| sdc_extend (sdcid, size) | Extends an existing SDC with ID = sdcid, with contents of size size |

FIG. 32

| Operation | Non-datasafe | Datasafe |
|---|---|---|
| Open | 117521.4 | 341109.8 |
| Add_sdc | N/A | 10177 |
| Read | 9016594 | 2847026 |
| Write | 2847026 | 1659347 |
| Delete_sdc | N/A | 3976 |
| Close | 22076.4 | 278525 |

FIG. 33

| App | 0.5 MB | | 2.5 MB | |
|---|---|---|---|---|
| | Non-DS | DS | Non-DS | DS |
| Hikidoc | 0.53 | 0.67 (26.42%) | 3.49 | 3.68 (5.44%) |

FIG. 34

|  | Ruby | C |
|---|---:|---:|
| Policy/Domain Handler | 1197 | 207 |
| Software | SPARC Assembly | C |
| Base Hypervisor | 37874 | 35066 |
| Datasafe Hypervisor | 41657 | 51959 |
| Crypto | 0 | 16045 |
| Hardware | SPARC Assembly | C |
| Base OpenSPARC | 1050 | 51395 |
| Datasafe Hardware | 0 | 3317 |

FIG. 35

| Instruction Category | Type | Propagation Rule |
|---|---|---|
| Integer Arithmetic | rs1, rs2 | $Tdest \leftarrow Tsrc1 \cup Tsrc2 \cup Tpc\ (\cup Tccr \cup Ty)$<br>$Tdest \leftarrow Tpc\ (\cup Tccr)$<br>$Tdest \leftarrow Tsrc1 \cup Tpc\ (\cup Tccr \cup Ty)$<br>$Tdest \leftarrow Tsrc2 \cup Tpc\ (\cup Tccr)$ |
|  | src, imm | $(Tccr \leftarrow Tsrc1 \cup Tpc\ (\cup Tccr \cup Ty))$<br>$(Tccr \leftarrow Tsrc1 \cup Tsrc2 \cup Tpc\ (\cup Tccr \cup Ty))$<br>$(Ty \leftarrow Tsrc1 \cup Tpc)$ |
|  | Multiply, Divide | $(Ty \leftarrow Tsrc1 \cup Tsrc2 \cup Tpc)$ |
| Memory Access | Load | $Tdest \leftarrow (Tsrc1 \cup)T[src1] \cup Tpc$ |
|  | Store | $T[dest] \leftarrow Tsrc1 \cup (Tdest \cup)Tpc$ |
| Branch | Conditional | if(Tccr ≠ 0) {Tpc = Tccr; Tpc_CNT = FLOW_MAX; }<br>if(Tsrc1 ≠ 0) {Tpc = Tsrc1; Tpc_CNT = FLOW_MAX; }<br>if(Tsrc1 ∪ Tsrc2 ≠ 0) {Tpc = Tsrc1 ∪ Tsrc2; Tpc_CNT = FLOW_MAX; } |
|  | Unconditional | None |
| Every Instruction |  | if(Tpc_CNT > 0) {Tpc_CNT--; } elseif(Tpc_CNT == 0) {TPC = 0; } |

FIG. 36

|  | Tagged words | FP | FN |
|---|---|---|---|
| Optimal | 465 | 0 | 0 |
| Baseline DIFT | 339.1 | 2.1 | 126 |
| Naïve DIFT | 3154.4 | 2691.4 | 0 |
| FlOW_MAX w / zero false negatives | 1720.6 | 1248.6 | 0 |
| FlOW_MAX balanced | 520.3 | 100.2 | 44.2 |
| FlOW_MAX w / Static binary analysis | 485 | 20 | 0 |
| FlOW_MAX w / Save/Restore optimal | 473.3 | 8.3 | 0 |

FIG. 37

| Function name | % | Description |
| --- | --- | --- |
| t10_s0n | 31.9 | Register spills. |
| etrap_save | 10.2 | Preparing for entry into the kernel. |
| run_timer_softirq | 6.1 | This function runs timers and the timer-tq in bottom half context. |
| schedule | 6.0 | The main scheduler function. |
| enqueue_hrtimer | 4.9 | Internal function to (re)start a timer. |
| scheduler_tick | 4.2 | This function gets called by the timer code. |
| msecs_to_jiffies | 4.2 | Conversion of time units. |
| getnstimeofday | 3.5 | Returns the time of day in a timespec. |
| hrtimer_interrupt | 3.5 | High resolution timer interrupt. |
| ntp_update_frequency | 2.2 | Updates ticks within the system. |
| Sum | 78.9 | |

FIG. 38

Input: Set of basic blocks
Output: Instrumented program binary
1 foreach *tagged branch block t* do
2     Find *t*'s immediate post-dominator block *p*;
3     Insert an empty block to ensure a unique immediate post dominator block, if necessary;
4     if *p is inside a loop and t is outside* then
5        Do a loop peeling to make sure *t* and *p* are at the same loop level;
6     end
7 end
8 foreach *tagged branch block t* do
9     Find *t*'s immediate post-dominator block *p*;
10     Push *Tpc* onto stack: push *(Tpc)*;
11     foreach *path from t to p* do
12        if *t reaches itself before reaching p* then
13            Insert in the path before reaching back to *t*, if a pop has not been inserted there for *t*: Pop old *Tpc* back from stack, *Tpc* = pop();
14        end
15     end
16     Insert before the beginning of *p*: Pop old *Tpc* back from stack: *Tpc* = pop();
17 end

FIG. 39

Input: Set of basic blocks
Output: Instrumented program binary
foreach *tagged branch block t* do
    Find *t*'s immediate post-dominator block *p*;
    Insert an empty block to ensure a unique immediate post dominator block, if necessary;
    if *p is inside a loop and t is outside* then
        | Do a loop peeling to make sure *t* and *p* are at the same loop level;
    end
end
foreach *tagged branch block t* do
    Find *t*'s immediate post-dominator block *p*;
    Push *Tpc* onto stack: push *(Tpc)*;
    foreach *path from t to p* do
        if *t reaches itself before reaching p* then
            | Insert in the path before reaching back to *t*, if a pop has not been inserted there for *t*: Pop old *Tpc* back from stack, *Tpc* = pop();
        end
    end
    Find *vset* = variables and memory locations that are changed between *t* and *p*, and reach *p*;
    foreach *j ∈ succ[t]* do
        Find cset = variables and memory locations that are defined between j and p;
        foreach *m, ∈ (vset - cset)* do
            | Insert tag assignment in the beginning of *j*: tag *(m)* = *Tpc*;
        end
    end
    Insert before the beginning of *p*: Pop old *Tpc* back from stack: *Tpc* = pop();
end

FIG. 40

| No. Test Case | DS | nDS |
|---|---|---|
| *Output Control* | | |
| 1  edit [F1, P1] | ✗ | ✓ |
| 2  append[F1, P1] | ✗ | ✓ |
| 3  read[F1, P1] ; save[F1, P1] | ✗ | ✓ |
| 4  read[F1, P1] ; send[F1, P1] | ✗ | ✓ |
| 5  read[F1, P1] ; display[F1, P1] | ✗ | ✓ |
| *Transformations* | | |
| 6  read[F1, P1] ; transform[F1, P1] ; save[F1, P1] | ✗ | ✓ |
| 7  read[F1, P1] ; transform[F1, P1] ; send[F1, P1] | ✗ | ✓ |
| 8  read[F1, P1] ; transform[F1, P1] ; display[F1, P1] | ✗ | ✓ |
| *Cross-Program* | | |
| 9  read[F1, P1] \| save[F2, P2] | ✗ | ✓ |
| 10  read[F1, P1] \| send[F2, P2] | ✗ | ✓ |
| 11  read[F1, P1] \| display[F2, P2] | ✗ | ✓ |
| *Transformations and Cross Program* | | |
| 12  read[F1, P1] ; transform[F1, P1] \| save[F2, P2] | ✗ | ✓ |
| 13  read[F1, P1] ; transform[F1, P1] \| send[F2, P2] | ✗ | ✓ |
| 14  read[F1, P1] ; transform[F1, P1] \| display[F2, P2] | ✗ | ✓ |
| 15  *Fine-grained Transformation and Tracking* | ✗ | ✓ |

FIG. 41

SYSTEM AND METHOD FOR SELF-PROTECTING DATA

RELATED APPLICATIONS

The present application claims the priority of U.S. Provisional Application Ser. No. 61/867,669, filed Aug. 20, 2013, the entire disclosure of which is expressly incorporated herein by reference.

STATEMENT OF GOVERNMENT INTERESTS

The present invention was made with government support under Grant No. CCF-0917134 awarded by the National Science Foundation. Accordingly, the Government has certain rights to the present invention.

BACKGROUND OF THE INVENTION

Field of the Invention

The present invention relates to the protection of sensitive data in computer systems. More specifically, the present invention relates to a system and method for self-protecting data.

Related Art

Computer users frequently download applications from unknown sources without feeling certain that the applications do not do anything harmful. In cloud computing, users frequently use third-party applications, like analytics or management programs, to process proprietary or high-value data. If users allow these applications to process confidential or sensitive data, they have to trust that the applications do not intentionally or inadvertently leak their data.

Allowing third-party applications to process sensitive data poses several challenges. First, users typically do not have source code and cannot modify the application program. They only know the application's advertised functions, but have no idea what the program actually does. Users can only execute the program binaries. Second, for a user-recipient who is authorized to access the sensitive data using the application in question, how can the sender ensure that the recipient does not then transmit the data, perhaps transformed or obfuscated, to unauthorized parties? Third, without expecting that the applications are outright malicious, users must assume that complex software will very likely have some bugs or security vulnerabilities Attempts have been made to resolve the aforementioned concerns. For example, the BitBlaze project combines static and dynamic analysis for application binaries for various purposes, e.g., spyware analysis and vulnerability discovery. Further, language-based techniques can prevent leaking of information by static type-checking of programs written in languages that can express information flow directly. Programmers can specify the legitimate information flows and policies in the program such that no illegal information flow would be allowed when compiling the program. This static method can be formally verified to be secure. However, it requires access to the source code and re-writing or re-compiling the applications.

Software solutions involving new operating system designs like HiStar and Asbestos proposed labeling of system objects to control information flow. A process (thread) that has accessed protected data is not allowed to send any data to the network, even if the data sent has no relation at all to the protected data. This coarse-grained information flow protection requires the application to be partitioned into components with different levels of privileges.

Other software solutions use binary translation, or compiler-assisted binary re-writing to change the program, for example, to turn implicit information flows into explicit information flows. However, such software-only information flow tracking approaches may be impractical due to prohibitive performance overhead. For example, to deal with tag assignments and bookkeeping, a single data movement instruction becomes eight instructions after binary translation. A single arithmetic/logic or control flow instruction is replaced by 20 instructions after binary translation. Even with parallel execution of the binary translation the performance overhead is around 1.5×. Further, hardware dynamic information flow tracking solutions include Raksha, which can detect both high-level and low-level software vulnerabilities, by programming (i.e., configuring) the Raksha hardware with a small set of four security policies at a time. Thus, only these four vulnerabilities can be detected.

GLIFT is another hardware dynamic information flow tracking (DIFT) solution that tracks information flow at a much lower hardware level—the gate level. It uses a predicated architecture (implying re-writing or re-compiling applications) which executes all paths of a program to track both explicit and implicit information flow, but at a much higher cost. While a very interesting and potentially promising approach, all the hardware has to be re-designed from the gates up, requiring unproven new hardware design methodologies and tools. Furthermore, the GLIFT protection cannot support chip crossings and machine crossings in a distributed computing environment.

These hardware DIFT solutions either support only a few fixed policies for detecting specific vulnerabilities, or require modifying the software. Whenever hardware is used for policy enforcement, there is a semantic gap between the flexibility of policy specification required at the user and domain level, and the restricted actions that can be supported by hardware.

Suh et al. proposed the architectural support for DIFT to track I/O inputs and monitor their use for integrity protection. They assume that the programs can be buggy and contain vulnerabilities, but they are not malicious, and the OS manages the protection and is thus trusted. One bit is used as the security tag that indicates whether the corresponding data block is authentic or potentially suspicious.

Information flow tracking can be achieved either statically before the program is run, dynamically when the program is running, or both. In addition, the tracking can be done at the software level or at the hardware level. The granularity of the tracking can also be varied depending on the application, e.g., at the lowest gate level or at a higher operating system objects level.

Static language-based software techniques track information by type-checking programs that are written in languages that express information flow directly. Programmers can specify the legitimate information flows and policies in the program such that no illegal information flow would be allowed once the program is compiled. This static method can be formally verified to be secure and can address most of the implicit information flow and even some side channels since the high-level semantics of the program can be checked. However, it requires access to the source code, requires re-writing or re-compiling the applications and makes the programmer responsible for specifying the information flow policy.

To be able to track implicit information flow while incurring minimal performance overhead, a hybrid approach that combines static analysis with DIFT is desirable. RIFLE is a hybrid approach that uses compiler-assisted binary re-writing to change the program to turn implicit information flows due to condition flags into explicit tag assignments. Once the implicit flows are turned explicit, the hardware can track these explicit information flows efficiently. The BitBlaze project also combines static binary analysis and dynamic tracking for application binaries for various purposes, e.g., spyware analysis and vulnerability discovery. Note that this hybrid approach is not to be confused with combining software information flow tracking with DIFT, as the static analysis does not track the information flow but merely assists the DIFT scheme to provide information which may be missed for a pure DIFT scheme.

Cavallaro et al. discussed several practical examples that can be used by malware to evade dynamic taint analysis. For example, control dependence, pointer indirection, implicit flows and timing-based attacks are described.

SUMMARY

Disclosed is a system comprising a physical memory, a processor and a software component. The software component includes a policy/domain handler configured to receive data and a policy associated with the data; a hypervisor; and a file management module. The file management module is configured to receive a request from a third-party application to interact with a data file containing the data; send an authorization and tag request to the policy/domain handler to check if the user and application are permitted to access the data, and if permitted, to generate hardware tags for the data file; and send a secure data request to the hypervisor to create a secure data compartment for the data file and the hardware tags. Based on the authorization and tag request, and the security policy associated with the data, the policy/domain handler generates the hardware tags for the data file. Based on the secure data request, the hypervisor creates in the physical memory a secure data compartment containing the data file and the hardware tags, the hypervisor associating the hardware tags with the data in the secure data compartment. As the data is operated upon and moved to other memory areas, the hardware tags are propagated with the data according to tag propagation rules, and checked before performing operations that may lead to security breaches.

Also disclosed is a method performed by a system comprising a physical memory and a processor. The method includes the steps of receiving data and a policy associated with the data; intercepting a request from an application to interact with the data; checking if access is allowed to the data, and if so, generating a plurality of hardware tags for the data based on the policy; creating in the physical memory a secure data compartment for the data and the plurality of hardware tags; associating the protected data with the plurality of hardware tags in the secure data compartment; and propagating the tags with the data as it is used or moved to other memory locations; and checking the hardware tags before performing operations that may lead to security breaches.

Also disclosed is a method for reducing the amount of false positives in a naïve data information flow tracking system performed by a computer system comprising a memory and a processor. The method includes: setting a counter value to a maximum value based on determining a tagged conditional execution; decreasing the counter value by one each time a tagged branch instruction is executed; and based on determining the counter value reaches a zero value, clearing the counter value.

BRIEF DESCRIPTION OF THE DRAWINGS

The foregoing features of the invention will be apparent from the following Detailed Description of the Invention, taken in connection with the accompanying drawings, in which:

FIG. 16 shows a simplified version of a set of computer instructions, to illustrate the effect of implicit information flows;

FIG. 17 shows additional functions of the set of computer instructions shown in FIG. 16;

FIG. 18 shows a function of the set of computer instructions shown in FIG. 16;

FIG. 19 shows a set of computer instructions for a function shown in FIG. 18;

FIG. 26 is a table showing a Comparison of DataSafe to other systems;

FIG. 27 is a table showing correspondence between policy-prohibited activities and exemplary hardware tags that restrict that activity;

FIG. 28 shows an example of how the user level policies are expressed;

FIG. 29 is an example of entries of an SDC list software structure;

FIG. 30 is an example of entries of the output memory map mem_map hardware structure;

FIG. 31 is a table showing examples of a policy/domain handler API;

FIG. 32 shows new hypercalls introduced to support the secure data compartments;

FIG. 33 is a table showing performance costs in terms of number of cycles (on the Legion Simulator) of software operations that implement the system, compared to those that do not;

FIG. 34 is a table showing performance costs in seconds of running an application on various file sizes on DataSafe and non DataSafe machines;

FIG. 35 shows the software and hardware complexity to implement DataSafe in the prototype implementation on the OpenSPARC system;

FIG. 36 lists the propagation rules for the baseline DIFT architecture as well as the tunable propagation employed in our implementation;

FIG. 37 shows false positive and false negative performances of DIFT systems with implicit information flow support;

FIG. 38 shows operating system functions;

FIG. 39 is an algorithm for reducing false positives due to tagged branches;

FIG. 40 is an algorithm for reducing false positives with untaken paths; and

FIG. 41 is a table showing test cases for illegal secondary dissemination and transformation tested for DataSafe (DS) and non-DataSafe (nDS) machines.

DETAILED DESCRIPTION

Figure 1:
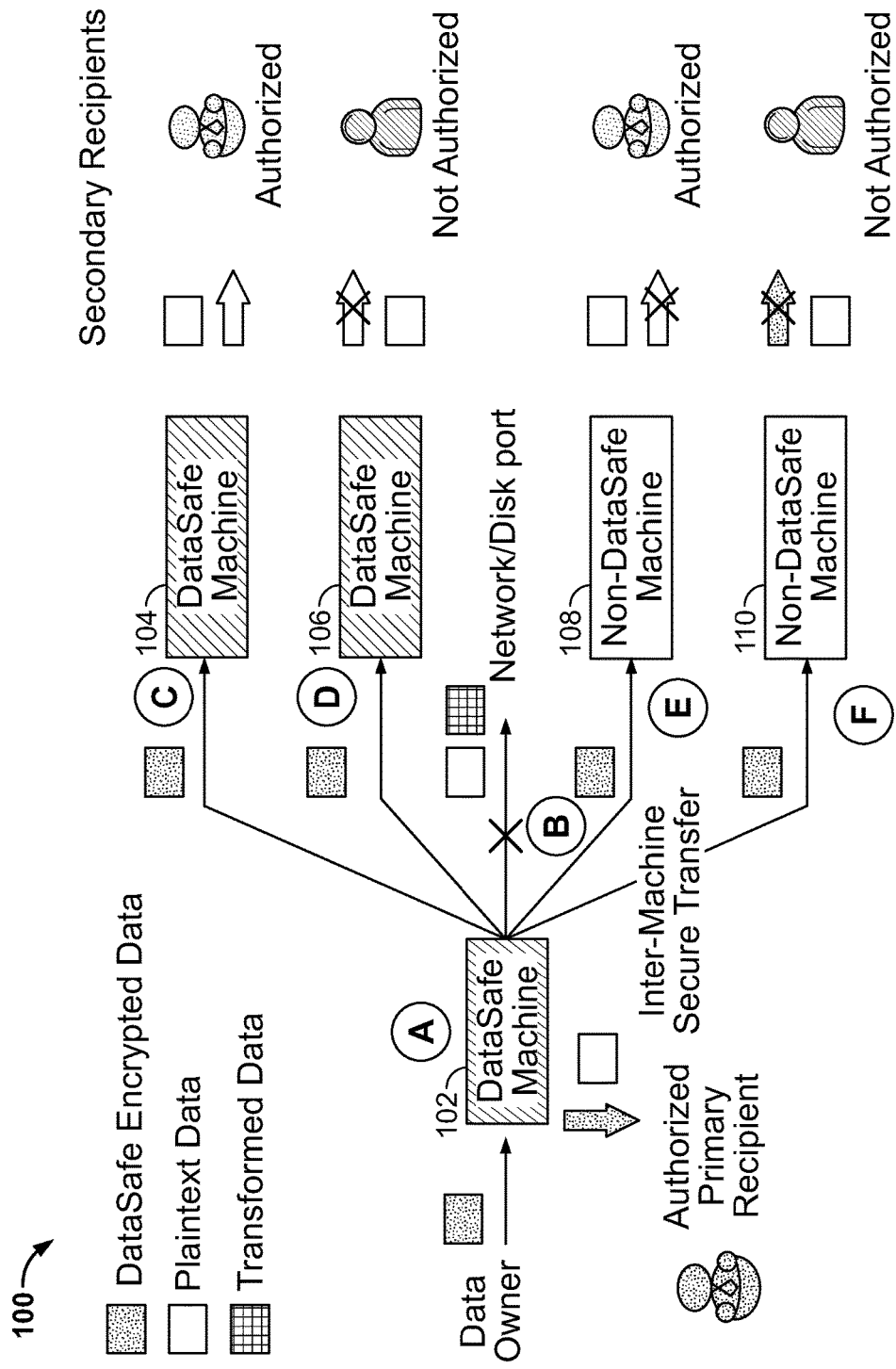
FIG. 1 is a schematic representation of a distributed computer environment for supporting the disclosed system for self-protecting data.

The present invention relates to a system and method for self-protecting data as disclosed herein in detail. The system is also referred to herein as the "DataSafe" system. DataSafe realizes the concept of self-protecting data: data that is protected by a given policy whenever it is accessed by any application—including unvetted third-party applications. The system provides dynamic instantiations of secure data compartments (SDCs), with hardware monitoring of the information flows from the compartment using hardware policy tags associated with the data at runtime. Also provided is a software architecture that enables the use of flexible, high-level security policies for protecting the data, seamlessly translating these policies to hardware tags at runtime. Applications need not be modified to interface to these software-hardware mechanisms. DataSafe is designed to prevent illegitimate secondary dissemination of protected plaintext data by authorized recipients, to track and protect data derived from sensitive data, and to provide lifetime enforcement of the confidentiality policies associated with the sensitive data. Also provided are micro-architectural solutions and hybrid software-hardware solutions that help build a practical and usable hardware dynamic information flow tracking system with minimal performance overhead, and that do not require access to the source code of applications.

DataSafe protects the confidentiality of data when processed by unvetted applications, e.g., programs of unknown provenance. The system is based on the following key insights in response to the challenges identified above. First, the data owner (not the application writer) is the one most motivated to protect the data, and hence will be motivated to make some changes. Hence, the provided architecture requires the data owner to identify the data to be protected and to specify the data protection policy. The application program is unchanged and continues to deal with data only, and is unaware of any policies associated with the data. This gives the added advantage of the architecture working with legacy code. The behavior of the application program must be monitored, to track the protected data as the application executes, and to ensure that its protection policy is enforced at all times.

Second, while an authorized user is allowed to access the data in the context of the application and the current machine (or virtual machine), data confidentiality (during and beyond this session) is protected as long as any output from the current machine is controlled according to the data's protection policy. Output includes the display, printing, storing to a disk, sending email or sending to the network. Furthermore, any data derived from sensitive data must also be protected. Hence, the system continuously tracks and propagates tags to identify sensitive data and enforce unbypassable output control.

The system realizes the concept of self-protecting data, data that is protected by its own associated policy, no matter which program, trusted or untrusted, uses that data. Thus, the system protects the data throughout the data's lifetime, including when it is at-rest (i.e., in storage), in-transit, and during execution. Also, the data protection applies across machines in a distributed computing environment, when used with legacy applications or new unvetted programs, across applications and across the user and operating system transitions. The system ensures that: (1) only authorized users and programs get access to this data (which we call primary authorization), (2) authorized users are not allowed to send this data to unauthorized recipients (which we call secondary dissemination by authorized recipients), (3) data derived from sensitive data is also controlled by the data's confidentiality policy, and (4) confidentiality policies are enforced throughout the lifetime of the sensitive data.

While well-known access control and cryptographic techniques can usually solve the problem of primary authorization, needed is an effective resolution to resolve problems (2), (3) and (4). Problem (2), the secondary dissemination by authorized recipients, is especially difficult and dangerous, since an authorized recipient of protected information (passing the primary authorization checks) can essentially do anything he or she wants with the protected information in today's commodity systems.

Secondary dissemination of protected information can be by an authorized user or by an application, and can be either malicious or inadvertent. A malicious user example could be a confidentiality breach by an insider, such as a nurse in a hospital trying to sell the personal information of some celebrity admitted to the hospital whose medical records he or she is authorized to access. An example of inadvertent secondary dissemination of confidential data could be a doctor trying to send his/her family a vacation plan as an attachment, but accidentally attaching some patient's psychiatry record instead. When programs are the culprits rather than users, a malicious, privacy-stealing malware, installed on an authorized user's machine through social-engineering, could send out sensitive information, or a benign application may contain bugs that could be exploited to leak sensitive information. The system enforces unbypassable output control to prevent such confidentiality breaches by authorized users.

Data derived from sensitive data must also be tracked and protected. An unvetted application program can be designed to leak sensitive information. It could transform or obfuscate the sensitive data. For example, a credit card number could be transformed and obfuscated into several paragraphs of text, before being output from the application, so that no sequence of numbers resembling a credit card number can be identified. This requires somehow tracking the information flows from protected data to other variables, registers or memory locations, across applications and system calls, and across combinations of data such as in mashups. It should be appreciated that the terms "self protected data" and "self protecting data" are used interchangibly throughout this disclosure. DataSafe appreciates that such continuous tracking of sensitive data, through any number of transformations, requires some form of dynamic information flow tracking, which is described in further detail below with reference to FIGS. 1-9.

For confidentiality policies to be enforced throughout the lifetime of the protected data, DataSafe uses encrypted packages to transmit data between DataSafe machines and non-DataSafe machines in a distributed environment. The system protects data confidentiality across machines (new and legacy) and users (authorized and not authorized).

FIG. 1 is a schematic representation of a distributed environment 100 supporting a DataSafe machine 102 (a machine that implements the present invention) as it interacts with other DataSafe machines 104, 106 and Non-DataSafe machines 108, 110 (machines that do not implement the present invention). The environment 100 includes a first DataSafe machine 102 used by a data owner. It is assumed that the data owner wants the sensitive data to be accessed and used by authorized users according to the data's associated security policy. The crosses "X" in FIG. 1 refer to actions or data transfers that are not allowed. The small square boxes represent data that is protected by a security policy attached to the data. This can be in encrypted form, in decrypted or plaintext form, or in transformed form. Different cases, labelled A, B, C, D, E and F, are illustrated in FIG. 1. In the example shown in FIG. 1, the user of a second DataSafe machine 104 is authorized, while the user of a third DataSafe machine 106 is not authorized; the user of a first Non-DataSafe machine 108 is authorized, while the user of a second Non-DataSafe machine 110 is not authorized. While the user of the second DataSafe machine 104 the user of the first Non-DataSafe machine 108 are both authorized, authorized users or applications can maliciously or inadvertently compromise the confidentiality of the protected data by distributing (or leaking) the plaintext of the sensitive data to unauthorized users. DataSafe addresses this problem by: (1) controlling the use of data and preventing leakage on a DataSafe machine while data is used by authorized users (Case A), (2) ensuring secure data transfer to both DataSafe and non-DataSafe machines, and in particular that no protected data is ever sent in plaintext outside the machine (Case B), (3) enabling only authorized users to use protected data on DataSafe machines (Case C, D), and (4) preventing any user from accessing protected data (in plaintext) on a non-DataSafe machine (Case E, F). Case E is restrictive, in terms of availability, but provides fail-safe confidentiality protection within the current ecosystem. (With built-in processor security, the idea is that eventually, all future ubiquitous computers will include DataSafe features).

Figure 2:
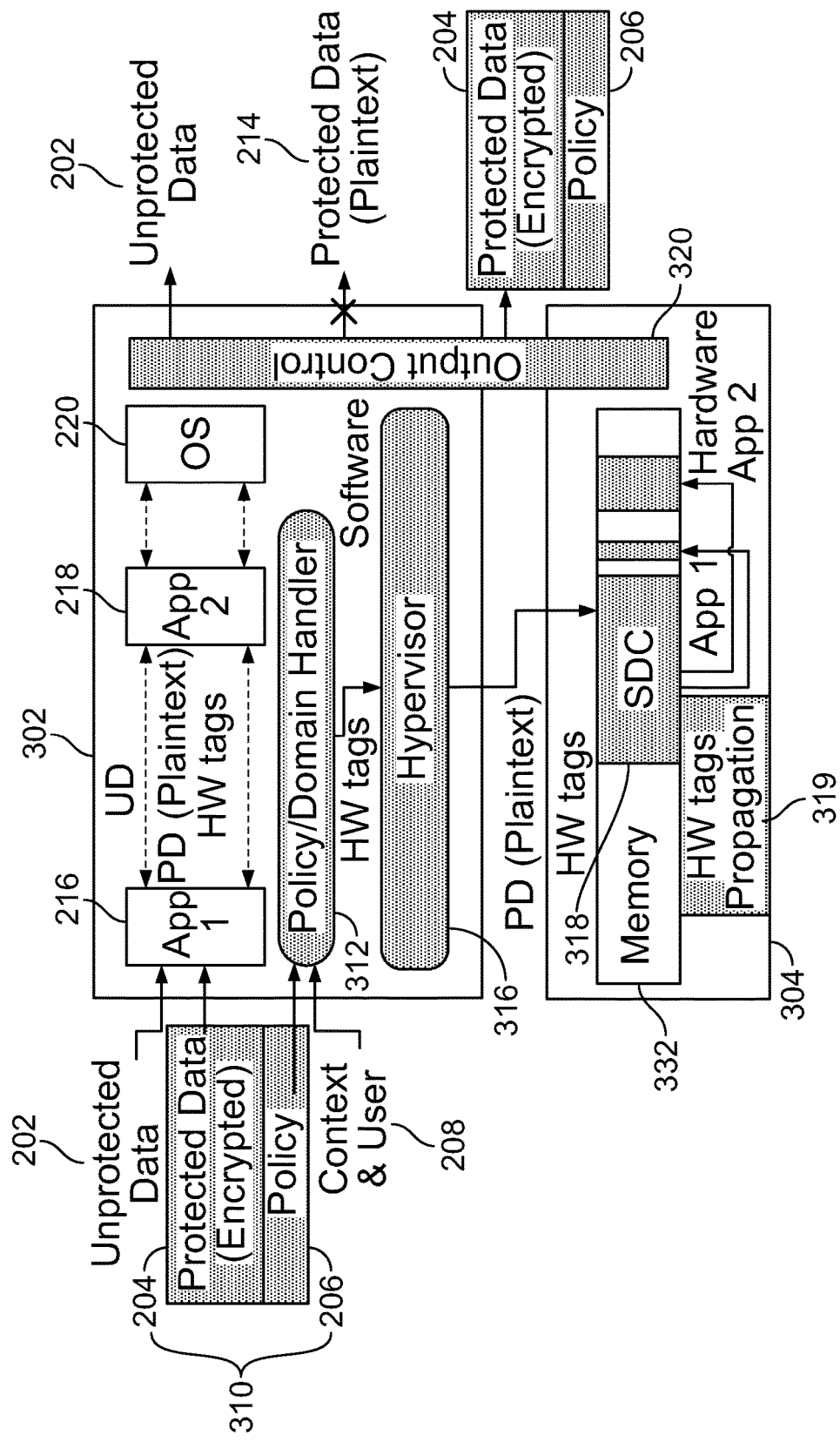
FIG. 2 is a schematic representation of software-hardware monitoring of protecting data in the disclosed system.

FIG. 2 is a schematic representation of the software-hardware monitoring of Protected Data (PD) in plaintext form, in the system, comprising software 302 and hardware 304. Unprotected Data (UD) 202 is unchanged. Since the hardware tags of the Protected Data 204 are tracked and propagated at the physical memory level by the hardware, this allows seamless tracking across applications 216, 218 and across application-OS (Operating System) 220 boundaries, as illustrated by the top row of boxes (where gray indicates DataSafe additions). To protect data-at-rest and data-in-transit, DataSafe uses strong encryption to protect the data 204, while ensuring that only legitimate users get access to the decryption key. For data-during-execution, DataSafe creates a Secure Data Compartment (SDC) 318 within the memory 332 where untrusted applications can access the data 204, decrypted into plaintext form, as they normally would. When data 204 (e.g., a protected file) is first accessed by an application, the Policy/Domain Handler 312 does a primary authorization check, before translating the data's high-level policy 206 to concise hardware "activity-restricting" tags. The DataSafe hypervisor 316 then creates Secure Data Compartments (SDC) 318, within which sensitive data 204 is decrypted for active use by the application. Each word of the protected data 204 in plaintext form in the SDC 318 is tagged with a hardware activity-restricting tag. From then on, DataSafe tag propagation hardware 319 automatically tracks the data that initially comes from SDCs 318, propagating the hardware tags on every processor instruction and memory access. output activities based on the hardware tags, thus preventing illegitimate secondary dissemination of protected data 204 by authorized recipients, even when the data has been transformed or obfuscated. The hardware tag propagation and output control is done without the knowledge of the applications software, and applies across applications and across application and operating system transitions. Hence, the software-hardware architecture prevents confidentiality breaches, enforcing the data's confidentiality policy, without requiring any modifications to the third-party applications. The DataSafe software-hardware architecture is further discussed below with reference to FIG. 3.

Threat Model and Assumptions

In this disclosure, we assume an attack model in which the main goal of attackers is to steal or leak out sensitive information that an authorized recipient is allowed to access. Attackers can exploit the vulnerabilities within third party applications or the operating system to leak sensitive data. The third party applications are untrusted and may or may not have gone through a vetting process but still may contain bugs or vulnerabilities that can explicitly or inadvertently leak information. This disclosure especially considers malicious software applications that may leak information through transformation of the data.

In this disclosure, it is assumed that the hardware computing device is trusted and does not contain any hardware Trojans. Also, the DataSafe software components, i.e., the policy/domain handlers 312 and the hypervisor 316, are trusted and correctly implemented to carry out their functionalities. Secure launch or secure boot technology is employed to launch the hypervisor 316 to ensure boot-time integrity (e.g., using Bastion, TrustVisor or TPM hardware). The guest operating system 220 running on the hypervisor 316 and the applications 216, 218, running on the guest operating system can be controlled by an attacker.

The DataSafe security model does not protect all data that exist on a device. A piece of data can be converted into DataSafe protected data by the DataSafe architecture, and hence will not be accessible, in plaintext, without the support of DataSafe. All other unprotected data remains unchanged and accessible as usual. It is assumed that authorized entities within a domain are authenticated using standard authentication mechanisms such as passphrases, private key tokens or biometrics. It is assumed that the entities within a domain have access to machines enabled with DataSafe hardware and software support if needed. Without proper support, anyone within or outside the domain can only access the encrypted information.

Figure 3:
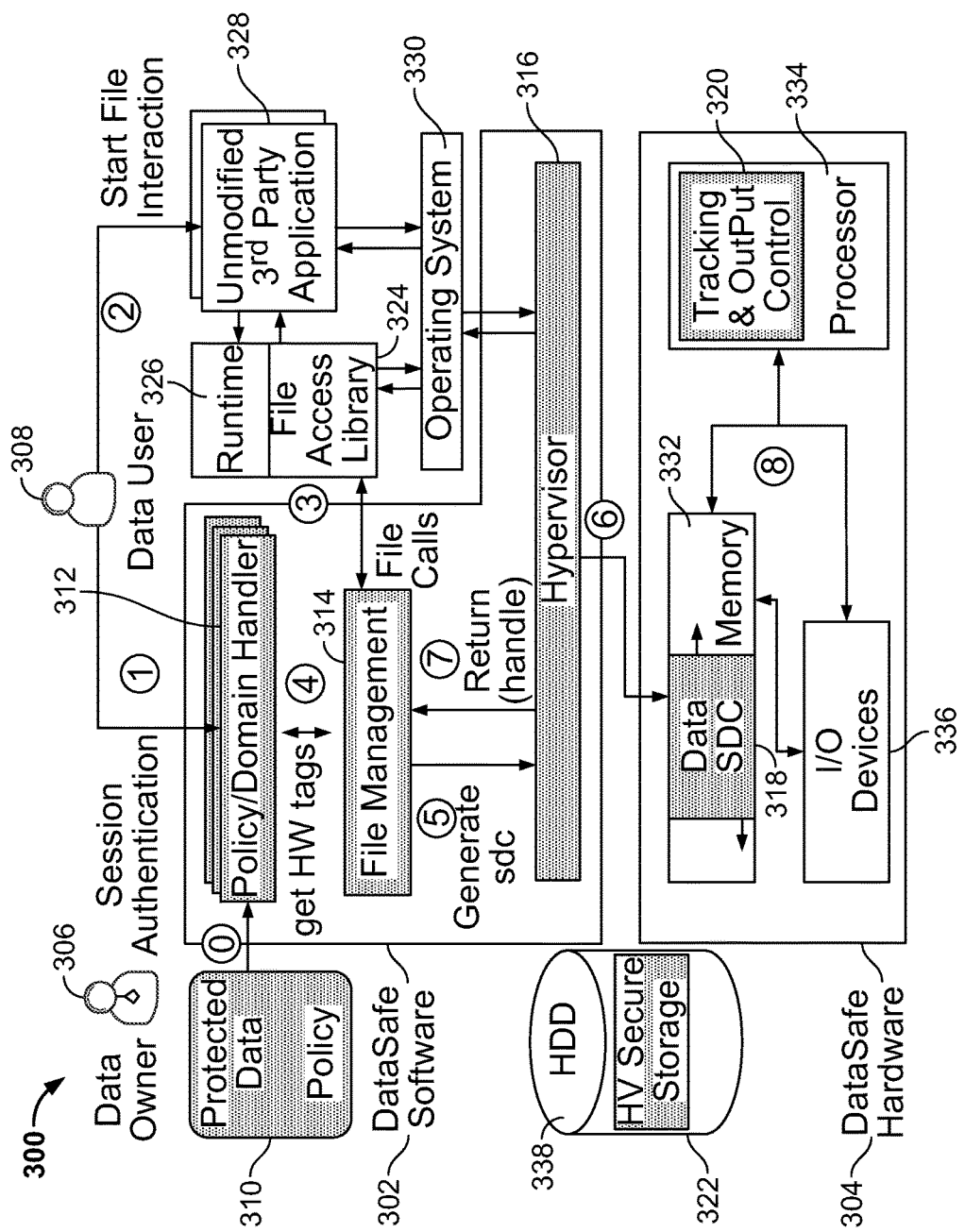
FIG. 3 shows a schematic representation of a computer system including the disclosed system.

FIG. 3 shows a schematic representation of a DataSafe computer 300, including the software components 302 and hardware components 304 as it interacts with a third-party application. The DataSafe computer 300 can be a DataSafe machine 102, 104, 106 discussed above with reference to FIG. 1. The new and trusted DataSafe components, including the protected data and policy 310, are shown in gray. The new and trusted DataSafe software 302 components include a policy/domain handler 312, a file management module 314, and a hypervisor 316. The policy/domain handler 312 can include any number of policy/domain handlers 312 while remaining within the scope of this disclosure. The striped file access library 324 is modified but untrusted. All other software entities, including a runtime module 326, unmodified third-party applications 328, and the operating system 330, are assumed to be untrusted. The new and trusted DataSafe hardware 304 components include a secure data compartment (SDC) 318 (a portion of the computer memory 332), a tracking and output control 320 (a portion of the computer processor 334) and hypervisor (HV) secure storage 322 (a portion of the hard disk drive (HDD) 338). All other hardware components, including the input-output (I/O) devices 336, remainder of the memory 332 (e.g., the portion that is not the SDC 318) and remainder of the HDD storage 338 (e.g., the portion that is not hypervisor secure storage 322) are assumed to be untrusted.

The DataSafe software 302 is configured to (1) translate protected data's high-level security policy into hardware enforceable tags, (2) create a secure data compartment (SDC) by associating the tags with the plaintext data in the memory, and (3) achieve application independence by enabling third party applications to use the data without having to modify the applications.

Those in the art will appreciate that a key challenge in the tag generation process is to create hardware tags that accurately reflect the permissions and prohibitions required by the data's security policy. Thus, in DataSafe, tags for a given policy are not fixed, but rather they change depending on the context within which the policy is interpreted. In DataSafe software 302, the policy/domain handler 312 translates policies to tags, and the hypervisor 316 associates hardware tags with data to create the SDC 318.

Both the hypervisor 316 and the policy/domain handlers 312 are assumed to be trusted code. The hypervisor 316 maintains its own secure storage 322 (protected by hardware) to store keys and other data structures. The hypervisor 316 is protected by the most-privilege level in the processor 334 and directly protected by the hardware 304 (e.g., as in Bastion). The policy/domain handlers 312 is run in a trusted virtual machine protected by the trusted hypervisor 316.

Figure 4:
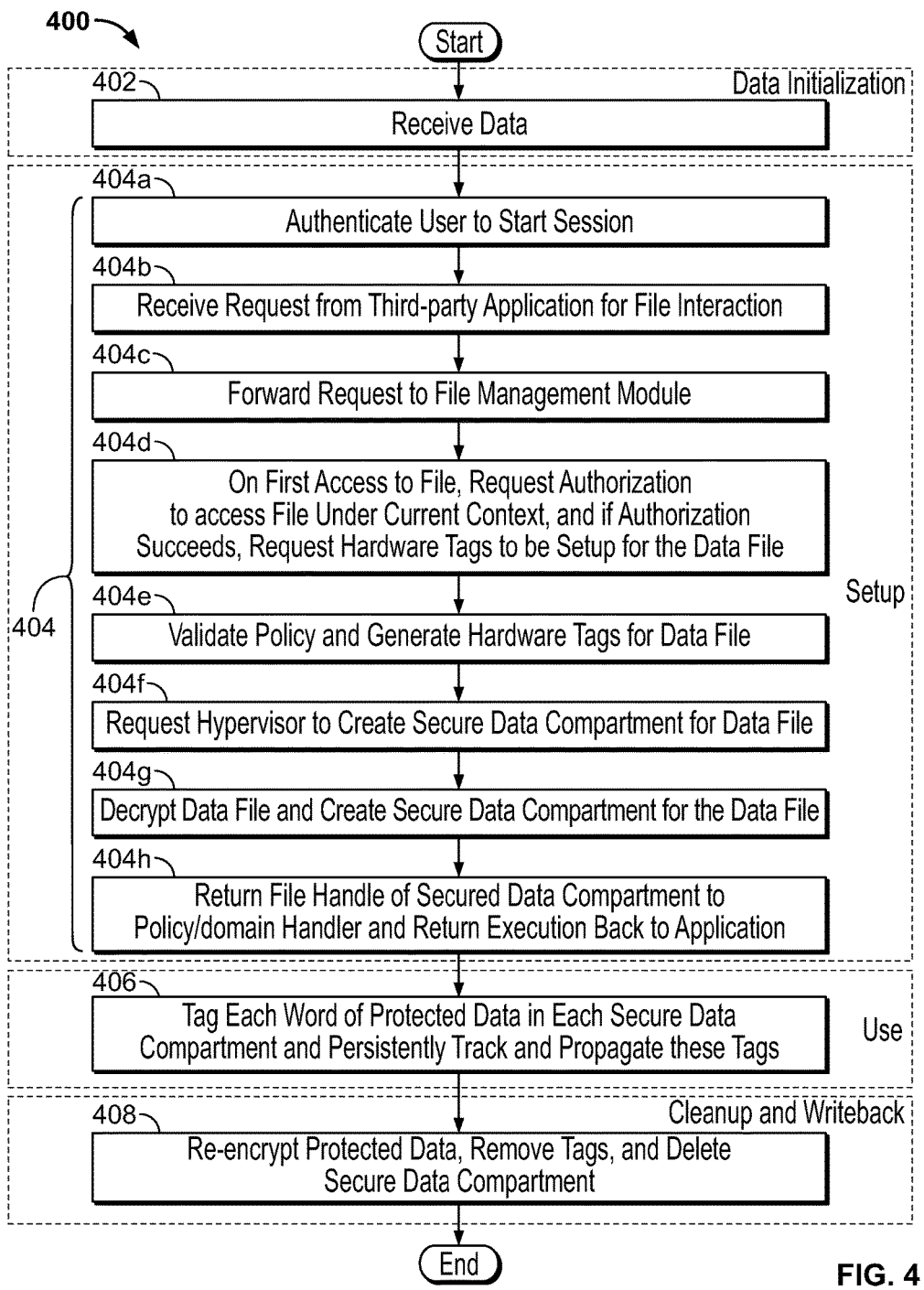
FIG. 4 is a flowchart showing processing steps performed by the system.

Referring to FIGS. 3-4, FIG. 4 shows processing steps 400 performed by the DataSafe computer 300 shown in FIG. 3. In the Data Initialization step 402, the computer receives a DataSafe package containing the data to be protected (e.g., encrypted data), along with its associated policy. This step is described further below with reference to FIG. 7. In step 404, the DataSafe computer 300 performs a Setup step. During the Setup step 404, the DataSafe computer 300 dynamically creates a secure data compartment (SDC) 318. An SDC 318 comprises hardware enforceable tags defined over a memory region that contains decrypted data. Thus, in creating the SDC 318, the DataSafe computer 300 generates hardware tags from the policy associated with the data 204. Once an SDC is created for a file, users can subsequently use the data file via potentially untrusted applications, while the hardware ensures that the data is used in accordance with the associated policy 206. Data 204 and its associated policy 206 in FIG. 2 are shown as one package 310 in FIG. 3.

The Setup step 404 includes eight sub-steps: substeps 404a-h. In 404a, the DataSafe computer 300 receives a user's 308 credentials, and the policy/domain handler 312 authenticates the credentials to begin a session. For a session with an authenticated user 308, data properties and other system or environment properties determine the context within which the data item is to be used. In 404b, the third-party application 328 requests file interaction. In 404c, the modified file access library 324 of the runtime 326 forwards the request to the file management module 314. In 404d, the file management module 314 requests the policy/domain handler 312 to check if the user is authorized to access the file within the current context. This is the primary authorization for allowing only authorized users to access the file, performed on the first access to the file per session. If primary authorization succeeds, the file management module 314 requests the hypervisor to provide the hardware tags to be set for the file. In 404e, the policy/domain handler 312 evaluates the policy associated with the data file taking into consideration the current context (i.e. the user/session properties, data properties and system/environment properties), and if access is validated, then it initiates the generation of appropriate hardware tags for the data file. If access is not validated, then the application is terminated, with an appropriate error message.

In 404f, if the access is validated, the file management module 314 requests the hypervisor 316 to create an SDC 318 for the data file with the corresponding hardware tags. In 404g, the hypervisor 316 decrypts the data file, and creates an SDC 318 for the data file associating the appropriate tags with each word in the SDC 318. In 404h, the file handle of the SDC is returned back to the file management module 314 and the execution is returned back to the application.

In the Use step 406, the DataSafe Tracking and Output Control hardware 320 tracks the tags of each word of the protected data in each SDC and persistently tracks and propagates these tags to tag registers (shown later in FIG. 9), cache tags and other memory words, according to the tag propagation rules (shown later in FIG. 36). Once an SDC is set up for a data file, in accordance with the session properties, any third-party application can operate on the protected data as it would on any regular machine. File calls, e.g., to read or write to a file that has been successfully setup in step 404, only go through the file management module, and do not need to access the Policy/Domain handler on each subsequent file access. The DataSafe Tracking and Output Control hardware 320 will ensure that only those actions that are in conformance with the data-specific policy are allowed. This is done transparently to the application software.

In the Cleanup and Writeback step 408, after the application finishes processing the data, the DataSafe hypervisor 316 re-packages the protected data and the policy if the data was modified or appended to, re-encrypts the protected data, removes the associated tags within the SDC, and then deletes the SDC.

Figure 5:
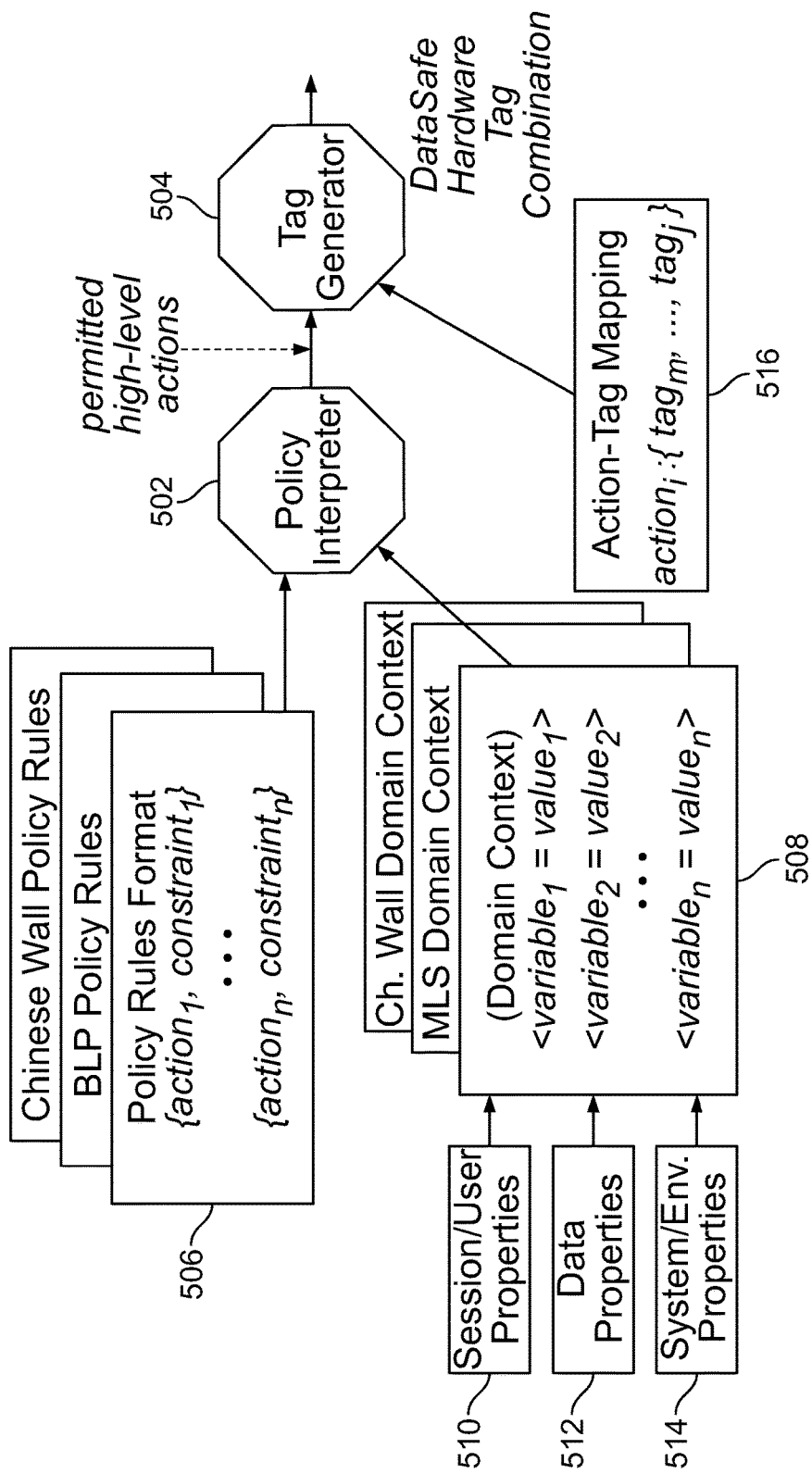
FIG. 5 is a flowchart showing how the software component of the disclosed system translates high-level policies to hardware tags.

FIG. 5 is a flowchart showing how the DataSafe software 302 translates high-level policies to hardware tags. More particularly, the two DataSafe software components, the policy/domain handlers 312 and the hypervisor 316 take a high-level policy (e.g., HIPAA, or a standard policy model like the Bell La Padula (BLP) Multi-Level Security (MLS) policy or the Chinese Wall policy), translate the policy into the hardware enforceable tags and create an SDC 318 for the protected data.

FIG. 5 shows the two step process employed by DataSafe. In step (1) a policy interpreter 502 interprets a security policy to determine what high-level actions are permitted. In step (2), depending on the high-level actions permitted, a tag generator 504 choses the appropriate hardware tags.

DataSafe is designed to be generic, supporting multiple policy languages and standard policy models such as BLP, Chinese Wall, etc. Therefore, policy rules from different policies are first represented in a common policy representation model 506.

A policy is expressed and interpreted in terms of a context 508, which typically includes information about session and user properties 510, data properties 512 and system and environment properties 514 necessary to interpret the policy appropriately, in a given domain context. For example, a BLP policy will require the user's security clearance and the data's security classification, whereas a RBAC (Role Based Access Control) policy will require the user's role. The context information is collected and stored in the form of {variable, value} pair. The policy and the context information are then fed to the policy interpreter 502, which determines what high-level actions are permitted by the policy, on the data, under the current context values. If no high-level action is permitted, then access is denied at this point. If this set is non-empty, it means that the user has authorized access to the data, but is expected to use the data only in the manner defined by the permitted action set. The permitted action set is then used to calculate the hardware tags, and to generate an SDC for the data.

The policy representation model 506 consists of a set of restricted actions $\{ra_1, ra_2, ra_3, \ldots, ra_n\}$, where each restricted action includes an action associated with a constraint, represented by $ra_i=\{action_i, constraint_i\}$. The action, is a high-level action such as "read", "play", "view", etc. The constraint, is a first-order predicate formula defined in terms of context variables. A context is defined by a set of variables $\{v_1, v_2, \ldots, v_n\}$, that represents session or user properties, data properties, and system or environment properties. A given constraint evaluates to either true or false based on the values of the context variables. For a given restricted action, $ra_i=\{action_i, constraint_i\}$, if $constraint_i$ evaluates to true, then $action_i$ is permitted, otherwise it is not permitted.

FIG. 27 is a table showing the correspondence between policy-prohibited activities and the hardware tags that restrict that activity. For every policy, the semantics of its high-level actions, described within the policy, have a specific interpretation in terms of hardware-level actions. Based on this interpretation, every high-level action maps to a set of hardware tags. DataSafe can support any number of hardware tag values. For example, FIG. 27 shows six supported hardware tag values as shown in Column 4. In FIG. 27, hardware restriction tags are expressed in the form of a bit vector, where each bit, when set to 1, corresponds to a type of restriction. The hardware tags are restrictive, which means that if a particular tag bit is set, that particular hardware-level action is prohibited. For example, if the tag bit 0x01 is set for an SDC, the DataSafe Hardware will prevent any application and the OS from copying that SDC's data to the display output. On the other hand, if the policy permits the action "view", then tag 0x01 should not be set. Hence, for a given policy interpretation, the set of tags corresponding to the permitted actions are not set, and the rest of the tags are. The tag generation process is independent of whether a policy is attached to a particular datum, or it applies system wide to all data items. Hence, DataSafe can support both discretionary access control policies (where a policy is applied to a particular file), and mandatory access control policies (where a policy is applied system-wide to all files classified at a certain security level as in MLS systems, e.g., BLP).

FIG. 27 shows an example of DataSafe hardware tags divided into three categories: (1) Access, (2) Transient Output, and (3) Persistent Output tags. Tags in the Access category, which include write (or edit), append and read, prevent in-line modification, appending or reading of an SDC. The tags in the Transient Output category refer to the output devices where the lifetime of the data ends after the data is consumed by the device, e.g., the display or the speaker. The Persistent Output category deals with the output devices where data remain live after being copied to those devices, e.g., network or disk drives. If an application or a user, after gaining authorized access to protected plaintext data, saves the data in plaintext form on a disk drive, or sends the plaintext over the network, the data's confidentiality is permanently lost. Most policies don't explicitly mention the requirement to prevent such activities, but rather assume that the authorized user is trusted not to illegally leak the data out. In order to enforce this critical and implicit assumption, in DataSafe systems, these two tags are always set, for all confidentialility-protected data, for all policies, except for policies that have explicit declassification rules.

Now turning to FIG. 28, to give a concrete example of how the policy translation works, considered is a Bell-LaPadula (BLP) policy defined over a multi-level security (MLS) environment. In this system, each user has a Security Clearance and each data item has a Security Classification. Both properties range over the ordered set {Top Secret>Secret>Confidential>Unclassified}. As shown in FIG. 28, the BLP policy states: "A user at a security clearance x can only read data items with security classification y such that y≤x, and can write only to data items with security classification z such that z≥x".

The context variables sec_clear represents Security Clearance and sec_class represents Security Classification. BLP has read and write as high-level actions, while leak data is an implicit action. Each action corresponds to the hardware tags as shown. The BLP policy is the set of restricted actions $\{ra_1, ra_2\}$, where the constraints are expressed as first order formulas over context variables sec_clear and sec_class. In Use Case 1, action read is permitted according to the BLP policy, and hence read tags are reset, while write and data leakage tags are set. In Use Case 2, write tags are reset, while read and data leakage tags are set.

Traditional BLP policy has only two actions read and write. It does not distinguish between reading some data from the memory and viewing data on the display screen. However, in some situations, the users are not humans but applications, and certain applications are allowed to read the data, but not allowed to display. For example, an application may be allowed to read and process passwords, but it is not allowed to display the plaintext password on the screen. For such applications, read and view are two separate high-level actions. As shown in FIG. 28, DataSafe, supports such an Extended BLP (shown in the last section of FIG. 28) by introducing a new high-level action "view", and changing the action-tag map.

Referring now to FIGS. 3 and 29, DataSafe defines the confidentiality-protection policy for the data and packages the policy with the data, rather than defining the policy by a particular application or its programmer. Thus, the data's policy is enforced no matter which application is accessing the data; therefore, applications are agnostic of DataSafe's operation and do not have to be modified to work with DataSafe. Only the file access library in the runtime or the interpreter has to be modified to redirect file calls of the application to the file management module 314 of the DataSafe Software. Furthermore, DataSafe-protected data are protected with the SDCs 318, where the SDCs 318 are defined at the hardware level, the layer below any software entity.

This is one of the key design features of DataSafe—the SDC 318 is defined over the physical machine memory, instead of the virtual memory, as shown in the example mapping in FIG. 29. This enables application independence and cross boundary data protection. Applications access their data through virtual memory. Once an SDC 318 is created in the physical memory, an application can access the data within the SDC by mapping its virtual memory to the SDC in the physical memory. This data can be passed to multiple applications or the operating system components, and still be protected by DataSafe hardware.

FIG. 29 is an example of entries of an SDC list software structure. Once the hardware restriction tags are determined for a given data file, DataSafe associates those tags with the memory region allocated to the file, without having to change how the application accesses the protected data. Such an association is achieved by a secure data compartment (SDC) 318. The DataSafe hypervisor 316 is responsible for the creation, maintenance and deletion of SDCs 318, and maintains an SDC list as shown in FIG. 29. An SDC 318 is a logical construct defined over a memory region that needs to be protected, independent of the application. Every SDC 318 has a start memory address, a size, and a tag combination specifying its activity-restricting rules with which the data within the SDC 318 need to be protected.

SDCs 318 can be defined at different granularities. DataSafe can define different types of SDCs 318 over different parts of the data object. For example, different sections of a document, different tables in a database, or different parts of a medical record need different types of confidentiality protection.

For applications to access the DataSafe-protected data in an SDC 318, the application file access library 324 is modified to redirect the access requests from the applications 328 to the policy/domain handler(s) 312, as shown previously in FIG. 3. The modified file access library 324 does not have to be trusted. In case the access request is not redirected by a malicious library for protected data, only encrypted data will be available to the application 328, which is a data availability issue instead of a confidentiality breach.

Figure 6:
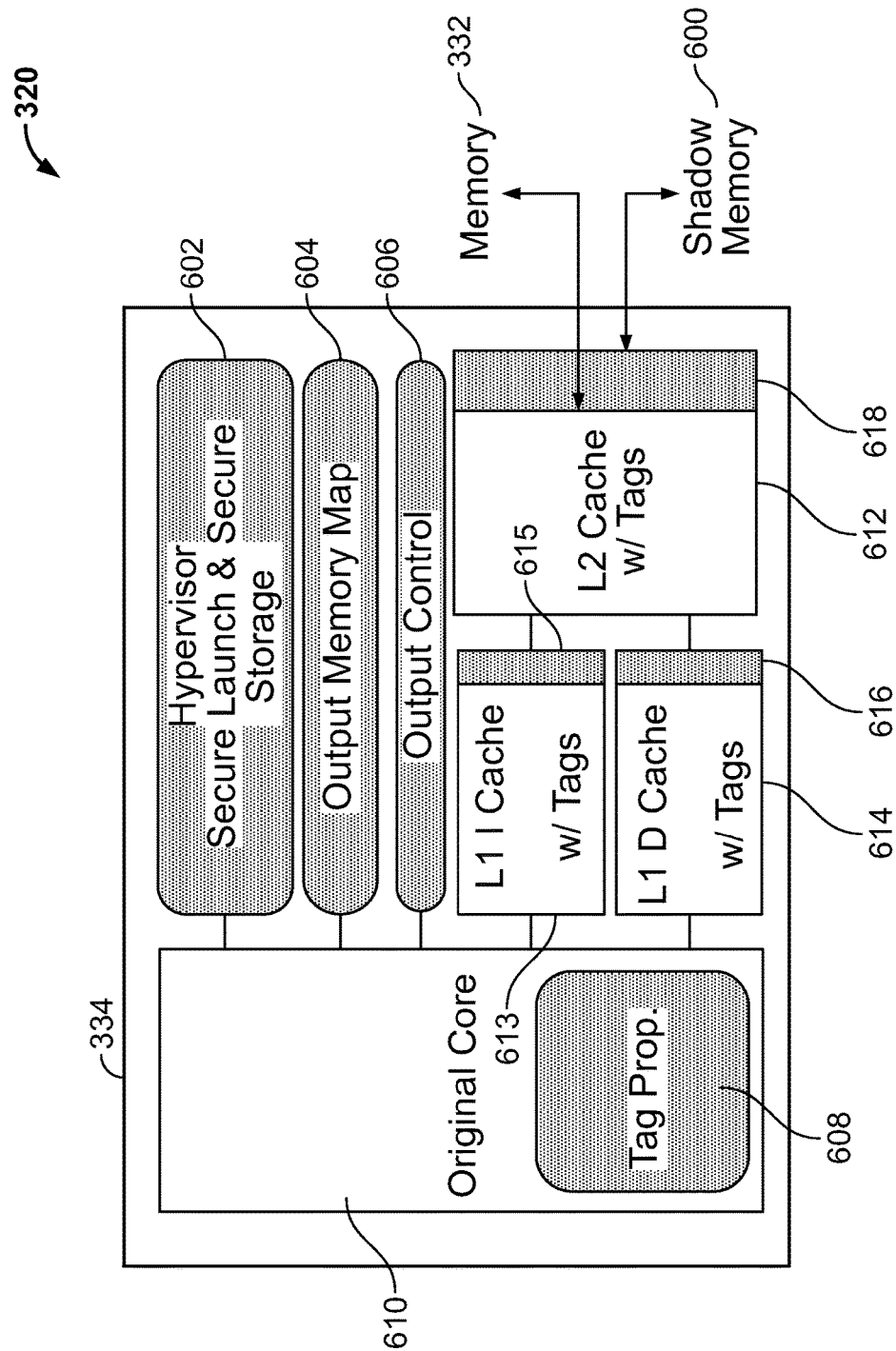
FIG. 6 shows tracking and output control hardware components of the disclosed software-hardware architecture.

Turning now to FIG. 6, shown are the tracking and output control hardware components 320 for providing continuous runtime protection for the protected data (now in plaintext) within an SDC while the application 328 is executing. The Non-DataSafe hardware components are shown in white and include the original core processor 610, level-1 instruction cache (L1 I cache) 613, Level-1 data cache (L1 D cache) 614, and a level-2 cache 612. The DataSafe hardware components are shown in gray and include a tag propogating module 608 portion of the processor 610, a hypervisor launch and secure storage 602, an output memory map 604, an output control 606, a level-1 instruction cache secure portion 615, a level-1 data cache secure portion 616, and a level-2 cache secure portion 618. Referring to FIG. 3, the DataSafe hardware mechanisms 320 track each word of the protected data throughout the execution of the untrusted application 328. The hardware mechanisms 320 are shown in greater detail as the tag propagating module 608, an output memory map 604 and an output control 606, with the associated DataSafe hardware tags in the secure portions, 615, 616 and 618, of the L1 instruction cache, L1 Data cache and L2 cache, respectively, in FIG. 6. DataSafe extends each 64-bit data word storage location in the caches and memory with a k-bit SDC ID (secure data compartment identifier) and a j-bit tag.

The shadow memory 600 shown in FIG. 6 is a portion of the main memory 332 set aside for storing the DataSafe tags. It is a part of the hypervisor secure storage 602, which the DataSafe hardware 304 protects and only allows the hypervisor 316 to access. The hardware tag is set by the hypervisor 316 when an SDC 318 is requested to be set up by the file management module 314. It will be appreciated that only the hypervisor 316 has read/write access to the shadow memory 600 for adding and deleting the tags for the SDCs 318.

To track and monitor where the protected data resides in the system 300, DataSafe propagates the tags along with the data from within the SDC 318 as the data goes outside the SDC 318 to other parts of memory. There are two levels of propagation for the tag bits of an SDC 318. First, the hardware tag bits are propagated from the shadow memory 600 to the last level on-chip cache, when a cache line is brought from the main memory 332 due to a cache miss. The same tag bits are copied throughout the cache hierarchy in the secure portions of the caches as the protected data moves into these caches, i.e., from the Last Level Cache (shown as the L2 cache in FIG. 6, with associated secure portion 618) up to the level-1 data cache secure portion 614 and the level-1 instruction cache secure portion 613. The general purpose registers in the processor core 610 are also extended with the ability to propagate the tag bits. On memory load instructions, the data is copied from the level-1 data cache 614 to the destination register in the processor core, while the associated DataSafe tag bits are copied from the level-1 data cache secure portion 616 to the tag portion of the destination register.

Each instruction executed in the processor performs tag propagation operations along with its arithmetic or other operations. This way the hardware restriction tags can track sensitive data even if the data has been transformed or encoded by the application. The principles of existing information flow tracking techniques are used, where the source tag bits are propagated to the destination register as long as the source register has a nonzero tag bit. In the case where both of the source registers have nonzero tag bits, we take the union of the two tag bits to give the destination register a more stringent policy. For load instructions, the union of the tag of the source address register and the tag of the source memory data is propagated to the tag of the destination register. For store instructions, the union of the tag of the source data register and the tag of the destination address register is propagated to the tag of the destination memory data. Thus, the tag propagations for load and store instructions account for the index tag for table lookups. For integer arithmetic and multiply and divide instructions, the tag is a combination of the tag of the first source register, the tag of the second source register, the tag of the condition code register and the tag of other registers that are used in the operation, e.g., the y register for the SPARC architecture to accommodate the multiply result that is twice as wide as each source register. The tag of the condition code register is also updated if the instruction has these side-effects of modifying the condition code register.

If both of the source registers are tagged with the same SDC ID, the destination register is also tagged with this SDC ID. If they are not from the same SDC, we assign a reserved ID tag of $2^k-1$. Since the resultant data does not belong to either of the two source SDCs, the SDC IDs are not combined; rather a special tag is substituted to indicate that this is an intermediate result.

The tag propagation rules described above handle explicit information flow from the data within an SDC, where the destination operands receive direct information from the source operands. There are also cases where the destination operand receives information from the source operand(s) through a third medium, e.g., the integer condition code or branch instructions. This kind of information flow is implicit but can be exploited to leak information. A vanilla dynamic information flow tracking system without considering such information flow would lead to false-negatives since information could be leaked without being tagged. However, a naive approach that tags any instruction that is dependent on the branch condition's tag may lead to an impractically large amount of false-positives. Solutions for implicit information flow are described in detail below with reference to FIGS. 10-26.

Turning now to FIG. 30, DataSafe hardware checks to see whether copying the data to another memory location or output device is allowed, or whether writing to memory locations within the SDC is allowed, according to the hardware tags. In particular, hardware checks if a memory location to be written to is a memory-mapped output device, and enforces unbypassable output control according to the tag of the word being written.

A new hardware structure is introduced inside the processor: the output memory map, mem_map. The mem_map is only accessible to the trusted hypervisor. It stores memory-mapped I/O regions and I/O ports to enable the hardware to know if a memory store instruction is attempting to perform output. It is checked on the destination address of memory store instructions, or any other instructions that write to an output device (e.g., in and out instructions in x86 architecture), to see if there is a violation of the output policy specified in the tag associated with the data to be written.

FIG. 30 shows example entries of the output memory map mem_map hardware structure. The device mask is a bit mask which indicates its functionality e.g., display, speaker, universal serial bus (USB) storage, network interface card (NIC), etc. Two devices having the same functionality would have the same mask value. In DataSafe, the mask can be designed to match the action-restricting bits in the hardware tags, so that it can be easily used by the hardware check logic to determine whether data with a specific tag value can be written to the I/O device.

DataSafe's tag propagation is performed by the hardware logic on the physical memory; therefore the propagation mechanism is not changed when the protected data is passed between applications, OS components or device drivers.

Direct Memory Access (DMA) data transfers do not need to include the hardware activity-restricting tags, which are runtime tags only and are not stored in persistent storage or transmitted on a network. DataSafe treats DMA regions as output device regions and performs output control to prevent protected data (based on their hardware tags) from being written to these DMA regions. The DataSafe hypervisor also prevents SDCs from being created over allocated DMA regions (and vice versa) so that data in SDCs cannot be over-written by DMA input transfers.

Figure 7:
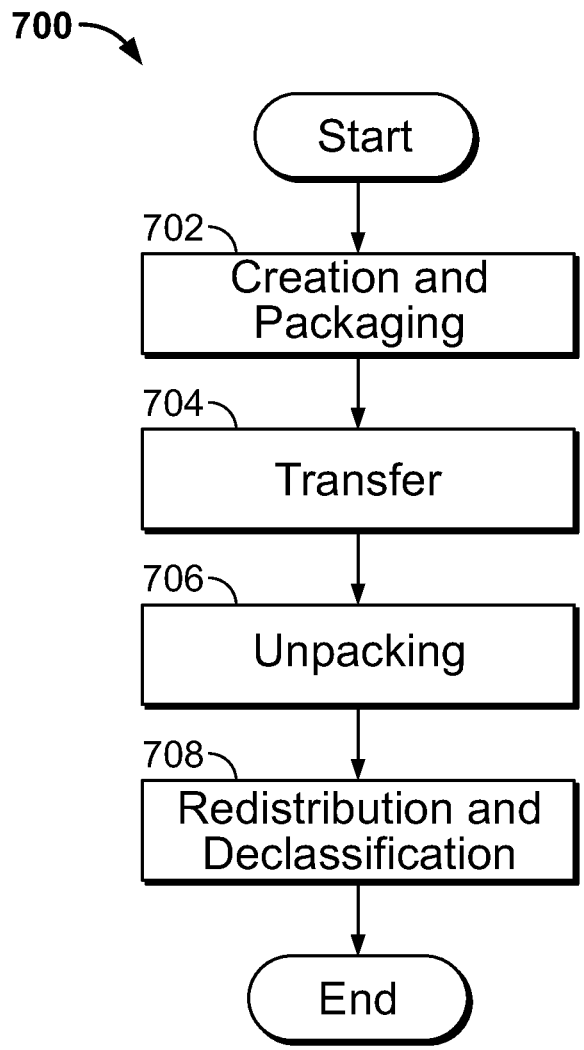
FIG. 7 is a flowchart showing processing steps for creating and unpacking self-protecting data packages.

FIG. 7 is a flowchart showing processing steps 700 for creating and unpacking DataSafe packages. The process includes four phases: Creation and Packaging 702, Transfer 704, Unpacking 706, and Redistribution and Declassification 708. In the Creation step 702, a piece of data can be turned into a piece of DataSafe-protected data on any computing device within the domain that is enabled with DataSafe support. The data owner can specify the confidentiality policy for the data. We describe one implementation of key management for a domain, e.g., a hospital; many other implementations are possible.

Figure 8:
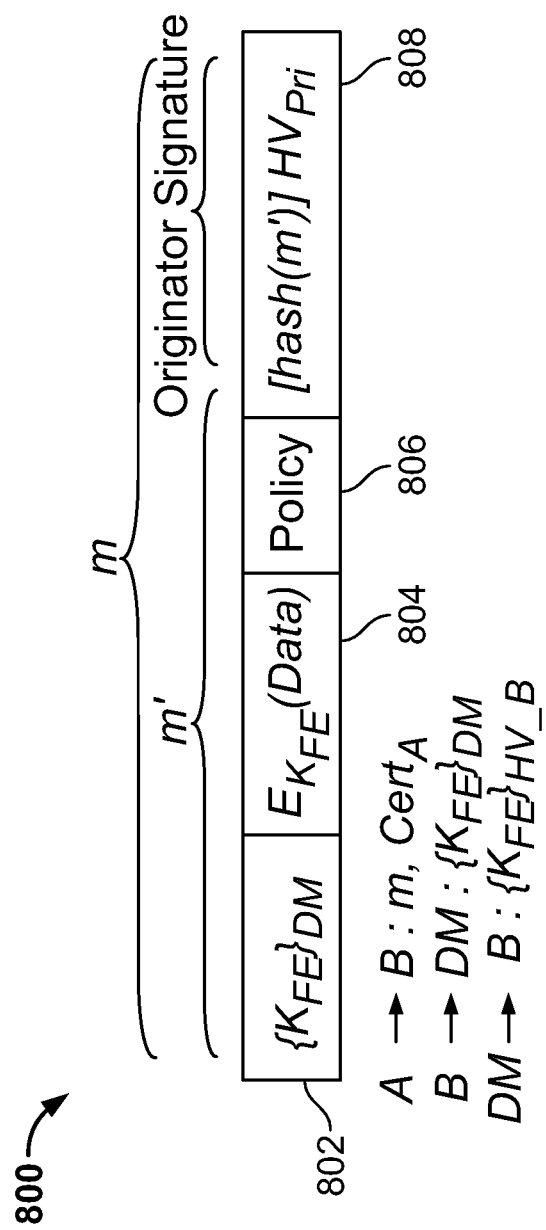
FIG. 8 shows formatting of a piece of self-protecting data.

FIG. 8 shows the format of a piece of DataSafe-protected data 800, with 4 parts 802, 804, 806 and 808. More specifically, FIG. 8 shows an Encrypted DataSafe package for storage and for transmission between machines: the originator (A), the receiver (B) and the domain manager (DM), with respective DataSafe hypervisors on A and B denoted as HV A and HV_B. $[x]_{HV}$ denotes a private key signature or decryption operation by HV, while $\{x\}$ denotes a public-key signature verification or encryption operation. $Cert_A$ denotes the public key certificate of A that is signed by the domain manager. To create DataSafe-protected data that binds the owner-specified policy to the data, the hypervisor 316 first generates a new symmetric key $K_{FE}$, called the file encryption key, and uses $K_{FE}$ to encrypt the data and place it in 804 of DataSafe package 800. $K_{FE}$ is then encrypted by the domain manager's public encryption key, $K_{DM}$. This is placed in 802 of DataSafe package 800. The security policy associated with the data is placed in 804 of DataSafe package 800, The trusted DataSafe hypervisor then calculates a cryptographic hash over the encrypted $K_{FE}$ 802, the encrypted data 804, and the owner-specified policy 806, and signs the hash using the its private signing key, HV_Pri, as the Originator Signature 808.

Referring back to FIG. 7, in the Transfer step 704, once an encrypted DataSafe self-protecting data package is created, it can be moved to any DataSafe enabled computing device within the domain for use. In a non DataSafe-enabled machine, only encrypted data can be accessed.

In the unpacking step 706, when an authorized recipient receives a piece of DataSafe-protected data and accesses it with an application, the policy/domain handler validates the data and the policy, and retrieves the file encryption key $K_{FE}$. Validation of the data and the policy is done by verifying that the Originator Signature 808 was signed by a trusted hypervisor within the domain. A hash is re-calculated over the contents in 802, 804 and 806, and compared with the decrypted hash in the Originator Signature 808, to ensure that the encrypted file encryption key, the encrypted data, the policy and have not been tampered with.

Since the file encryption key $K_{FE}$ is encrypted with the domain manager's public encryption key, the policy/domain handler follows a secure protocol to retrieve the file encryption key. The domain manager ensures that the requesting hypervisor is not on the domain's revocation list; otherwise the request is denied. In DataSafe, public-key cryptography is used for system identification and non-repudiation to protect smaller-size items such as the $K_{FE}$, and efficient symmetric-key cryptography is used for protecting the larger data content. Since the $K_{FE}$ is encrypted, it can be stored on the user's machine in the normal unsecured storage, whereas the originating machine's hypervisor's private signing key, $HV_{Sign}$, and the recipient machine's domain manager's secret decryption key are stored in their respective DataSafe machine's hypervisor secure storage (See FIG. 3). Note that since the $K_{FE}$ is encrypted using the domain manager's public encryption key, no key exchange between different DataSafe systems is required. Only individual communication with the domain manager is needed. To prevent the domain manager from becoming a bottleneck or a single point of failure, multiple or backup key management servers can be installed on other DataSafe machines to provide enhanced data availability.

During Redistribution and Declassification 708, an authorized user can access the DataSafe protected material in plaintext, and also pass on the original DataSafe encrypted package (signed by the originator) to another machine. If he transforms the protected data and wants to pass this modified data to another machine, he has to re-package it (as described for packaging above) and sign with his own trusted hypervisor's private key.

Some data items may get declassified to be used on non-DataSafe devices. Declassification is done by the Domain/Policy Handler while the data is not in use (not loaded into memory) by any application, and thus precludes the need to un-tag the data. This allows for authorized declassification by trusted software components—by decrypting the data, and dissociating any policy associated with it. Once declassified, such data can be treated as data that can be used on any device, including non-DataSafe devices.

Policy/Domain Handler

Referring back to FIG. 3, the policy/domain handler 312 is primarily responsible for hardware tag generation from the high-level policy. It is also responsible for setting up the context, which includes maintaining the values for session and user properties, data properties, and system and environment properties. Since both these responsibilities are specific to a particular information domain, DataSafe includes a separate policy/domain handler 312 for each domain. For example, a first policy/domain handler 312 can be implemented for Multi-level Security systems that supports BLP and Biba policies, a second policy/domain handler 312 can be implemented for the Chinese Wall policy, a third policy/domain handler 312 can be implement for the Clark-Wilson model, and a fourth policy/domain handler 312 can be implemented for medical information systems. In all policy/domain handlers 312, policies are represented in the standard policy model using the XML format, the current embodiment. New policies can be specified in XML and interpreted directly by the policy interpreter. Each policy/domain handler 312 maintains a separate database for storing user and data properties. All policy handlers 312 share a common policy interpreter, which is possible since all policies are represented in a standard form.

File Management Module

The file management module 314 provides a file management API for accessing DataSafe-protected files and provides file handling functions, with examples shown in FIG. 31. The file management module 314 loads the encrypted file into the memory 332, and forwards the file access request to the policy/domain handler 312, which translates the policy associated with the file into hardware tags, and the file management module 314 requests the hypervisor 316 to set up a Secure Data Compartment.

file management module 314 can support file handling functions for Ruby-based applications. The Ruby Interpreter can be modified to redirect file handling calls to the file management module 314. The file management module 314 provides a file handle to the Ruby Interpreter, which it subsequently uses for file operations. If a file attempts to obtain untagged data by bypassing the redirection of file calls, it only ends up getting encrypted content. DataSafe can also include similar file management modules 314 for non-interpreted languages such as C with a modified C-library (libc) for redirected protected file access.

Hypervisor

The hypervisor 316 is responsible for the instantiations of SDCs 318, the management of domain-specific secret keys and the provision of environment properties for context generation. To manage the SDCs 318, the hypervisor 316 keeps a software structure, called the active SDC list, sdc_list, which stores a list of active SDCs for all policy/domain handlers.

FIG. 32 shows the new hypercalls introduced to support the SDCs: sdc_add, sdc_del and sdc_extend. Hypercalls for context generations and others are omitted. The sdc_add hypercall is called when the policy/domain handler requests a new SDC. The sdc_del is called later to delete an SDC. The sdc_extend is used when the high-level policy allows for appending to the protected data, where the size of a SDC is adjusted to include appended data.

DataSafe Prototype

A DataSafe prototype implementation builds upon the open source processor and cache hardware and hypervisor in the OpenSPARC platform. The current prototype is implemented in the Legion simulator of the OpenSPARC platform. This simulates an industrial-grade OpenSPARC T1 Niagara processor with 256 MB of memory, running the UltraSPARC Hypervisor with Ubuntu 7.10. The load_from/store_to alternate address space (ldxa and stxa) instructions in the SPARC architecture are utilized to access the new hardware structure, mem_map, at the same time limiting the access to only software with hypervisor-level privilege.

The open source hypervisor in the OpenSPARC platform is modified and extended with the functionality to support secure data compartments (SDCs). The new hypercall routines are implemented in SPARC assembly and the SDC-specific functions are implemented using the C language. The policy/domain handler is implemented in the Ruby language and the policies are expressed in XML format.

Security, Performance and Cost of DataSafe Architecture

Security Tests

The prototype was tested with several experiments.

Support for High-Level Policies

The support for high-level policies was tested; policies were interpreted and automatically mapped into hardware tag generation at runtime. Three different types of policies were tested: a multi-level security policy using the BLP policy, a multi-lateral security policy using the Chinese Wall policy, and the inventor's own concocted hospital policy.

All these policies were first expressed in the DataSafe policy model in an XML format. The policies were then interpreted using the DataSafe policy interpreter and hardware tags were generated under different contexts. For each policy, the read/display, write and output control were tested. With the hospital policy, scenarios were tested of a malicious nurse leaking out private information, and the accidental leak of psychiatric data through email by a doctor.

Application Independence

DataSafe's capability to support unmodified third party applications was tested, using three applications, Ruco, Grepper and HikiDoc, downloaded from RubyForge. All three are Ruby-based applications. Ruco is a lightweight text editor, Grepper provides the same functions as the "grep" command-line utility for searching plain-text data sets for lines matching a regular expression, and HikiDoc reads text files and converts them to HTML documents. The inventors were able to run all the three applications on DataSafe, unmodified.

The experiments with the Ruco editor include basic read/display and write control. In addition Ruco was modified to test illegal saving of plaintext data on the disk, either with or without data transformation. A similar set of experiments were carried out with the Grepper application. In addition, with Grepper the inventors tested fine-grained tracking by creating SDCs with different tags and sizes over different parts of a file—DataSafe could successfully track the data and enforce fine-grained output control of sensitive data.

With HikiDoc the inventors tested a scenario for authorized read but prohibited display. In this scenario, simulating "password leak" attacks, the HikiDoc application takes two files as input: 1) text file (to be converted to HTML), and 2) a file containing passwords for user authentication. The program is supposed to read the password file for authentication, but not leak the password out. For the test, a malicious piece of code was inserted in the application which transforms the password into a code, and then distributes the code at predefined locations in the HTML file. The attacker can then retrieve the code parts from the HTML file, assemble the code, and reverse the transformations to get the original password. DataSafe could track the transformed pieces of a password and prevent their display.

In all these applications, the data read from the file is passed through different Ruby libraries, the Ruby Interpreter, and the operating system, before being displayed. In addition, the data is processed in different formats before being output in a presentable form. Tests on these applications show that DataSafe is application independent, can continuously track protected data after multiple transformations and can do this across multiple applications in the user space, and across the user-OS components.

Continuous Data Tracking and Output Control

Apart from testing policy support and application independence, the experiments above also test the capability of DataSafe to enforce SDCs and hardware activity restricting tags. This includes the capability to track protected data in a fine grained manner across applications and OS, and to enforce output control only on that data which is tagged with such a restriction. The insight the inventors derived from the above tests is that a more comprehensive, yet quick, coverage can perhaps be achieved by just a small set of synthetic test cases which represent different classes of attacks that can leak protected data, as shown in FIG. 41. In each test case, programs were run on the DataSafe machine (DS column), and on an existing non-DataSafe machine (nDS column). For each test case, the sensitive data files were protected by a policy to prohibit the test case scenario. FIG. 41 is a table showing test cases for illegal secondary dissemination and transformation tested for DataSafe (DS) and non-DataSafe (nDS) machines. In FIG. 41, "F" represents a file, and "P" represents a program. "X" means attack failed (good) and a check-mark means attack succeeded (bad).

Test cases 1-5 test the output control capabilities of DataSafe based on output port types. In these cases, SDCs were created to prevent edit, append, save, send over the network, and display. Test cases 6-8 represent data transformation attacks by a single program. In these cases, a test program reads and transforms the data multiple times, and then tries to send the data out on one of the output ports (i.e. disk, network and display). Test cases 9-11 represent cross program attacks, where data is read by Program 1 (P1) and passed on to Program 2 (P2) which carries out the attack. Test cases 12-14 represent transformation and cross program combined attacks. In these test cases, data is read by Program 1 (P1) and transformed multiple times, and then the transformed data is sent to Program 2 (P2), which carries out the attack. In test case 15, different parts of a file were protected by SDCs with different protection tags. DataSafe was able to prevent different attacks targeting each of these protected segments. In all the test cases, the attack succeeded in the existing machine (nDS), but DataSafe (DS) was successful in defeating the attack.

Performance and Cost

Since DataSafe is a software-hardware architectural solution, its advantages come at the cost of changes in both hardware and software. These costs are in two distinct phases: 1) the Setup (and Termination), carried out by DataSafe software, incurs performance costs in the redirection of file calls and setting up of SDCs, and 2) the Operation phase, carried out by DataSafe hardware, incurs performance costs due to information flow tracking and output control. We analyze the cost of these changes separately, and then discuss the end-to-end cost of running third party applications.

Software Performance

FIG. 33 shows the costs incurred for file operations open, add_sdc read, write, delete_sdc and close. The overhead of open is due to file access redirection and the setting up of memory mapped regions which does not take place in non-DataSafe machines. The cost of adding and deleting SDCs on DataSafe is small compared to the other operations. These performance costs are the same for any file size.

In contrast, we actually achieve better performance during the Operation phase for read and write operations in DataSafe because of the use of memory mapped file operations. These performance gains are directly proportional to the file size (shown for reading or writing a 2.5 MB file in FIG. 33). Hence, as the file size increases, the performance costs of open and close get amortized leading to better results. This is verified by the total application execution times of different file sizes, shown in FIG. 34. As the file size increases, the relative performance cost of DataSafe decreases. For a reasonable file size of 2.5 MB, the performance cost of DataSafe is only about 5%.

Hardware Performance

Next, the hardware performance overhead is evaluated using a separate and parallel tag datapath. While the hardware tags can be added to the existing processor datapaths by extending the widths of the registers, buses and caches (as shown in FIG. 6), FIG. 9 shows that the hardware tags can also travel through a separate datapath.

Figure 9:
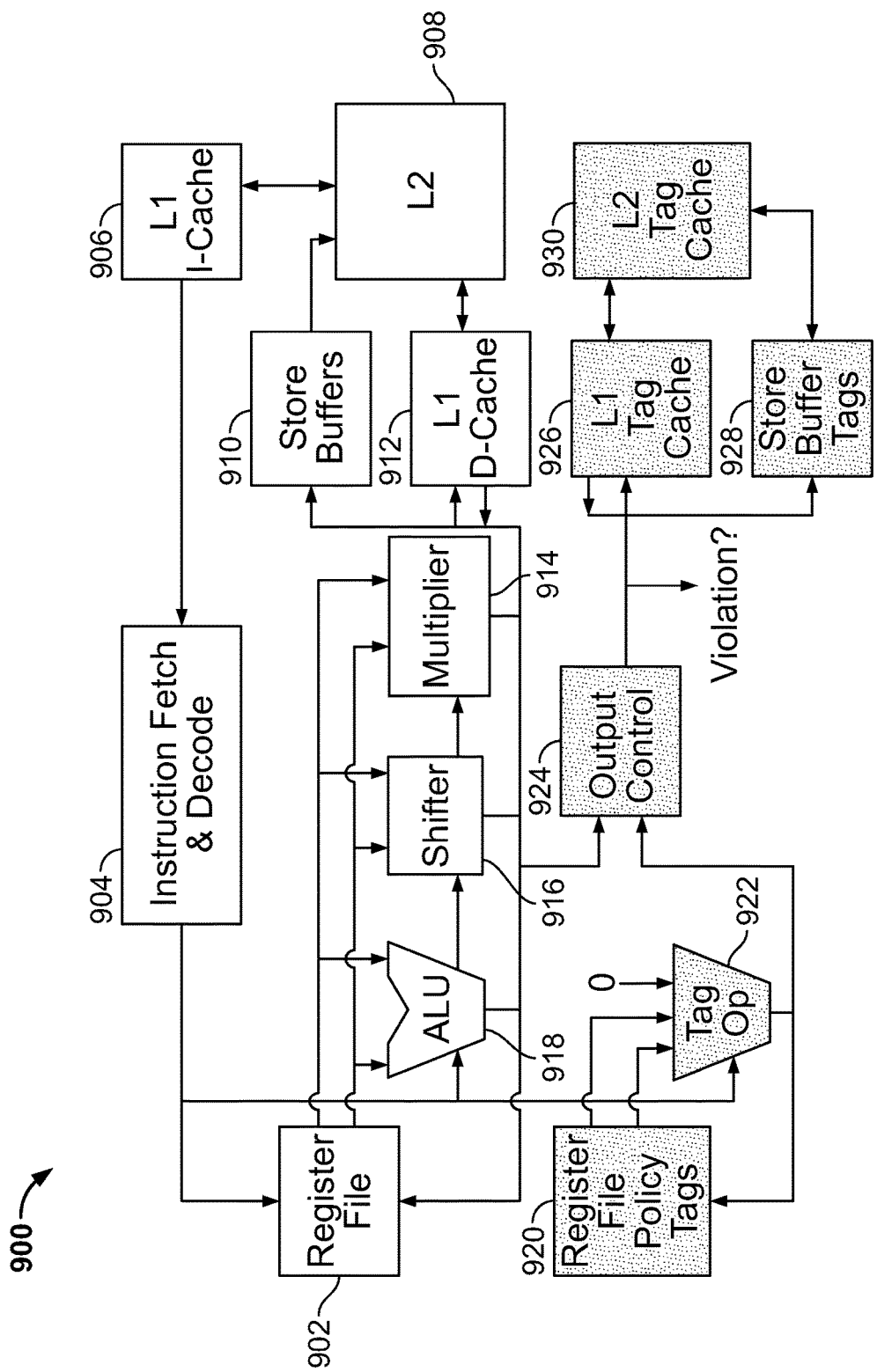
FIG. 9 shows the flow of information in a system where hardware tags travel through a tag datapath that is separate from and parallel to existing processor datapaths.

FIG. 9 shows the flow of information in a system where hardware tags travel through a tag datapath that is separate from and parallel to existing processor datapaths. FIG. 9 shows the flow of a system 900 comprising a register file 902, instruction fetch and decode unit 904, level-1 I-cache 906, a level-2 cache 908, store buffers 910, a level-1 D-cache 912, a multiplier 914, a shifter 916, an ALU 918, a register file policy tag module 920, a tag Op module 922, output control module 924, a level-1 tag cache 926, a store buffer tags module 928, and a level-two tag cache 930. The components shown in gray in FIG. 9 (the register file policy tag module 920, tag Op 922, output control 924, level-1 tag cache 926, store buffer tags module 928, and level-two tag cache 930) are DataSafe components, while the components shown in white (register file 902, instruction fetch and decode unit 904, level-1 I-cache 906, level-2 cache 908, store buffers 910, level-1 D-cache 912, multiplier 914, shifter 916, and ALU 918) can be existing components.

Since all tag propagation operations can be done in parallel, the only source of hardware runtime overhead involves the output checking of memory store instructions. However, memory stores are not on the critical path, as opposed to memory loads, and normally stores are delayed waiting in the store buffer queue for an unused cache access cycle. Hence, the output checking can be performed while the memory store instruction sits in the store buffer or the memory write buffer. Output control involves checking against the mem_map structure, similar to the operation of a victim buffer or a small fully associative cache, with a different comparator design. The comparator for a victim buffer is testing for equality, whereas here the comparator tests whether the store address lies within the memory region mapped to an output device. The net effect of performing output checking on store instructions is equivalent to adding a one cycle delay for store instructions waiting in the store buffer queue. Hence, the output checking has no discernible impact on the overall processor bandwidth (in Instructions executed Per Cycle, IPC).

Storage Overhead and Complexity

The software complexity of DataSafe amounts to a total of 50% increase in the hypervisor code base, about half of which was for a suite of encryption/decryption routines for both asymmetric and symmetric crypto and cryptographic hashing algorithms. Each sdc_list entry takes up about 26 bytes of memory space, considering a full 64-bit address space. The total storage overhead incurred by the sdc_list varies according to the number of entries in the sdc_list. In our prototype implementation 20 entries are typically used, amounting to around half a kilobyte of storage overhead.

For the DataSafe hardware, the main cost comes from the cache and memory overhead for storing the tags. For a 10-bit tag per 64-bit word used in our prototype, the storage overhead is 15.6% for the shadow memory, on-chip caches and the register file. Existing techniques for more efficient tag management can be applied to reduce storage overhead.

FIG. 35 shows the software and hardware complexity to implement DataSafe in the prototype implementation on the OpenSPARC system. They show that the software and hardware complexity of DataSafe is relatively small, compared to the baseline OpenSPARC hypervisor and hardware. Much of the software complexity, in additional lines of code, is just the crypto software.

Comparison of DataSafe to Prior Work

Unlike prior work, DataSafe supports automatic mapping of flexible software confidentiality policies, associated with the data not the application, to hardware tags suitable for enforcing the data confidentiality policy. The hardware tags are used for efficient hardware information flow tracking during runtime and for enforcing unbypassable output control. Furthermore, the DataSafe solution fits in the current software ecosystem, and does not require any changes to the application program. FIG. 26 is a table showing a Comparison of DataSafe to other systems in supporting (1) expressive high-level policies, (2) automatic translation of software policy to hardware tags, (3) unmodified third-party applications, (4) continuous runtime data tracking, (5) unbypassable output control, and showing if (6) new hardware is required.

As seen in FIG. 26, the first three rows are software-supported Information Flow Tracking methods, while the next three rows are hardware-supported Dynamic Information Flow Tracking (DIFT) solutions. The seventh row, labelled Basion, is an example of other hardware-enabled approaches, which do not implement DIFT techniques, but instead protect sensitive data by requiring access to it via a trusted software component that ensures data confidentiality. These solutions rely on certain trusted components in the application or the underlying operating system to provide data protection. Applications have to be re-written to include a trusted component to access protected data, which is not possible in our scenarios where we do not have access to source code. In contrast, DataSafe allows untrusted applications to access our self-protecting data.

The Trusted Platform Module (TPM) is the industry standard for protecting the integrity of a system's software stack, and is also used to protect the encryption/decryption keys which in turn protect the confidentiality of data. However, the TPM, while being able to perform a level of primary authorization by checking the integrity of the software stack, has no control over the decrypted data once the access to the keys has been granted. DataSafe prevents this problem of the secondary dissemination of confidential decrypted data. Furthermore, while TPMs can protect software that then protects the data, this approach ties the data with the protected software, whereas DataSafe provides application-independent data protection.

DataSafe's self-protecting data has similarities to digital rights management (DRM). Numerous policy models exist for expressing and interpreting usage and DRM policies such as UCON, XrM, ODRL, etc., however these models cannot be used successfully unless they have a trusted computing base to enforce their policies. A key advantage of DataSafe software is that it is policy language agnostic, and can therefore incorporate these policy models when used in different information domains. Furthermore, DataSafe will also enable the use of different applications along with these policy models while utilizing the policy enforcement trusted computing base provided by the DataSafe architecture.

DataSafe realizes the concept of Self-Protecting Data. This architecture allows unvetted application programs to use sensitive data while enforcing the data's associated confidentiality policy. In particular, DataSafe prevents secondary dissemination by authorized recipients of sensitive data, protects data derived from sensitive data, and protects sensitive data at-rest, in-transit and during-execution. DataSafe architecture is the first architecture that bridges the semantic gap by automatically translating high-level policies expressed in software into hardware tags at runtime, without requiring modification of the application program. DataSafe provides efficient, fine-grained runtime hardware enforcement of confidentiality policies, performing derivative data tracking and unbypassable output control for sensitive data, using enhanced dynamic information flow tracking mechanisms.

Mitigating Techniques for Practical Dynamic Information Flow Tracking

Dynamic Information Flow Tracking

Provided next is a new improved Dynamic Information Flow Tracking (DIFT) solution. Digital information is an important asset, e.g., a person's social security number or medical record. On the other hand, the information can also be used as an effective weapon. For example, malicious or malformed input can cause buffer overflow, which may potentially lead to a complete compromise of system security. Furthermore, information can be abused or misused to either carry information that is not intended, i.e., covert channels, or to gather information indirectly, i.e., side channels. Although confidentiality and integrity can often be considered duals of each other, in this disclosure, we focus on protecting the confidentiality of data. In other words, we treat information as an asset and want to prevent information leakage using Information Flow Tracking (IFT).

In this section, we identify and categorize different possible information flows that could occur within a computer system. In particular, we focus on the aspect of information flow pertaining to the execution of the untrusted application.

Figure 10:
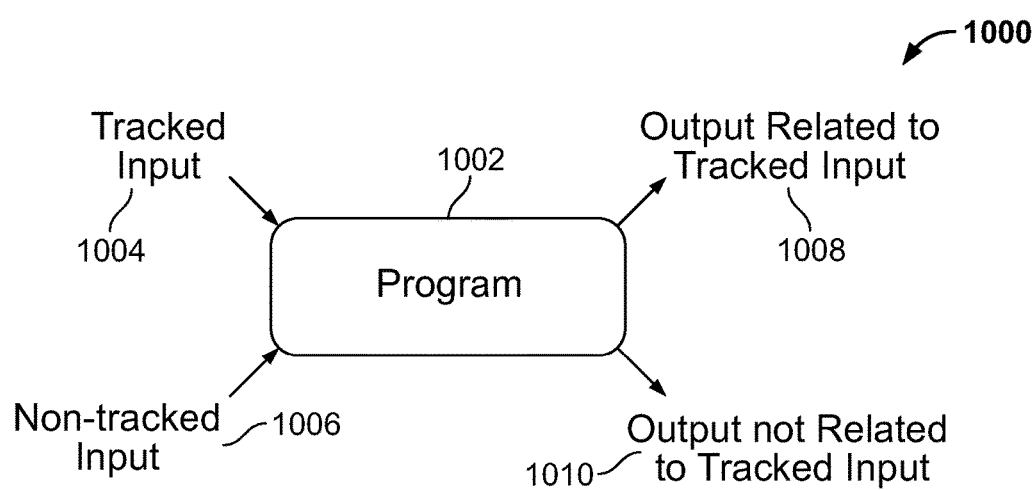
FIG. 10 shows a high-level schematic representation of tracking information flows during program execution.

FIG. 10 shows a high-level schematic representation of tracking information flows 1000 during program execution. The program 1002 receives tracked input 1004, i.e., the sensitive data we wish to track, and non-tracked input 1006, input that is not related to the sensitive data, e.g., constants or environment variables. The goal of information flow tracking is to be able to identify which part of the program's 1002 output is related to the tracked input 1008, and which part is not related to tracked input 1010, in order to determine if the program is leaking any sensitive information. A program's execution consists of the execution of a chain of instructions. Therefore, in order to understand how information flows or propagates through the execution of a program, this disclosure discusses below how information flows within an instruction and across instructions.

It will be apparent to those skilled in the art that the following are the basic rules or assumptions of IFT: (1) Each data storage location is extended with an associated data "tag", e.g., memory, cache lines, registers or entries in a load-store queue. (2) The tag is considered as attached to the data and travels along with the data wherever the data is stored or processed. (3) The tag can be of arbitrary size, representing different meanings depending on the particular architecture. (4) For the purpose of this disclosure, a non-zero tag value denotes the corresponding data to be sensitive and protected, whereas a zero tag value denotes non-sensitive data.

Information flows resulting from the execution of program instructions can be largely divided into two categories: (1) explicit information flows, and (2) implicit information flows. Explicit information flows refer to the cases where actual data values are propagated from the source to the destination. For example, a load instruction copies the data value from the memory (source) to the register (destination). Correspondingly, the tag of the same memory location should be copied to the tag of the destination register, to capture the information flow from the memory to the register. On the other hand, implicit information flows occur not by direct data copying, but through program side-effects. For example, if the time taken to execute an instruction is dependent on a tagged register value (a data is considered "tagged" if its corresponding tag value is non-zero), although there is no direct data movement between the tagged register and the time measurement, the time measurement does carry information related to the tagged register value. These implicit information flows can also be considered as software side-channels or covert-channels.

Figure 11:
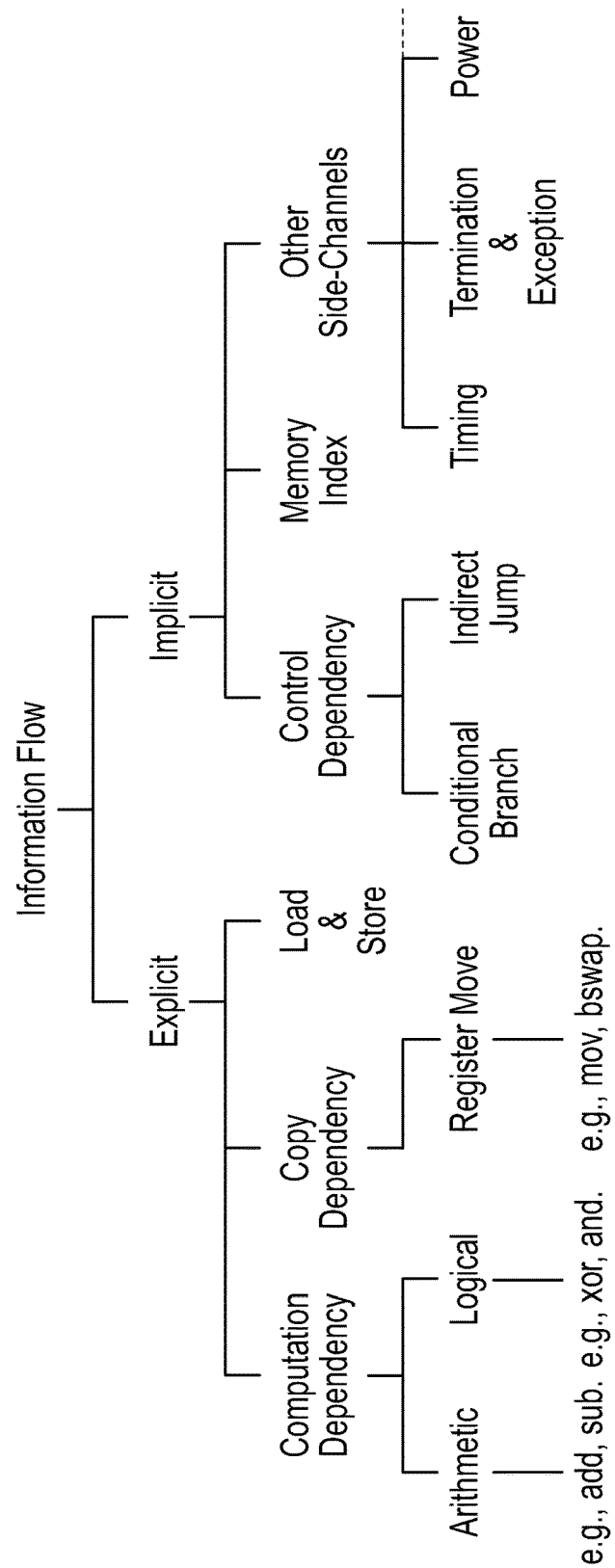
FIG. 11 shows the taxonomy of information flows resulting from the execution of a program.

FIG. 11 shows the taxonomy of information flows resulting from the execution of a program. Before giving examples for the items in FIG. 11, the following are notes on the properties of an ideal information flow tracking system. First, an ideal information flow tracking system should exhibit no false positives and no false negatives. In other words, an ideal system should be able to distinguish between data that is truly related to the source input and data that is not related. Second, an ideal information flow tracking system should be able to recognize special conditions that erase information, such as zeroing a register by xor (exclusive or) with itself. Third, an ideal information flow tracking system should be able to track seemingly unrelated events, e.g., timing or power, and determine if those output channels contain information related to the source input. Fourth, an ideal information flow tracking system should be able to identify data that are truly conditionally dependent on the source input, and track the information flows correctly. For example, a data value that is modified when a certain condition happens should be tagged, whereas a variable that happens to be assigned the same value under all possible conditions should not be tagged. Fifth, an ideal information flow tracking system should be able to understand program semantics to determine whether or not information flows across table lookups. For example, character conversion using table lookups does carry information from the table lookup index, whereas information should not propagate from node to node in a linked-list traversal, if only one of the nodes is tagged.

Explicit Information Flow

Arithmetic:

an arithmetic operation such as add, sub or div usually takes two source variables, computes the result and puts the result into the destination variable. For example, an assignment a←b+c means that the variable a gets information from both variables b and c. Correspondingly, we denote the tag assignment to be tag (a)←join(tag (b),tag (c)). The join( ) operation is definable according to how the tags are defined. For an IFT scheme with 1-bit tags, the join( ) operation can be defined as a simple logical or of tag (b) and tag (c).

Logical:

a logical operation such as or, and or xor behaves similarly to arithmetic instructions described above. Therefore, they use the same join( ) operation for the tags. Special cases such as zeroing a register using xor's are treated differently, since no information flows from the source registers to the destination register in these cases.

Register Moves:

A mov instruction copies the contents of one register to another, and also copies the associated tag of the source register to the destination register. Swapping register values, e.g., the bswap instruction, also swaps their associated tags.

Memory Loads & Stores:

load instructions copy data values from the main memory to the destination register, whereas store instructions copy data values from the source register to the main memory. Correspondingly, the tag of the source (memory or register) is copied to the tag of the destination as well. For a load example, a←[addr], the tag assignment should be tag(a)←tag([addr]).

The above examples are cases where direct data flows are involved within an instruction. Next we give examples where information flows without having direct data flows.

Implicit Information Flow

Conditional Control Dependency:

modern general purpose computer architectures employ certain mechanisms to conditionally execute some code, which is often realized using a set of status or flag registers, e.g., the FLAGS register in x86 or the Condition Code Register (CCR) in SPARC. A typical set of flags include the zero flag, the carry flag, the sign flag and the overflow flag. An arithmetic or logical instruction can affect the value of these condition flags if a certain condition is met. For example, the if statement in C can be implemented using an arithmetic instruction that sets the condition flag with a branch instruction that branches to certain locations in the code depending on the value of the condition flag. Therefore, it is possible for information to flow from the arithmetic instruction to the condition flag, and from the condition flag to the instructions executed after the branch instruction. In this disclosure, we focus on this case of implicit information flow and will go into the details below.

Indirect Jump:

indirect jumps execute some code based on the jump target value stored in a register (or sometimes, in two registers). Therefore, information flows from the register that stores the target address to the instruction executed after the jump instruction. If the jump targets can be known or determined statically before the program's execution, we can handle the indirect jumps in a similar fashion as conditional branches, since they both set the new program counter's value depending on the value(s) of some register(s). However, if the jump targets cannot be determined statically, the entire memory space could potentially be the target for the indirect jump. Program-level information is needed to determine whether or not there is information flow across the indirect jump.

Memory Indexing:

memory indexing is related to the memory loads and stores described previously, regarding the addr component that is used to decide which memory address to read from, or write to, for a load or store instruction, respectively. The fact that the addr component decides the memory address implies that some information is passed from the addr to the destination, whether the destination is a memory location or a register. Therefore, taking the memory indexing into account, we have a modified tag assignment for the previous load instruction example: tag(a)←join(tag([addr]),tag(Reg$_{addr}$)), where Reg$_{addr}$ denotes the register that contains data for calculating the value of addr. For the previous store instruction example: tag([addr])←join(tag(a),tag(Reg$_{addr}$)), where Reg$_{addr}$ denotes the register that contains data for calculating the value of addr. To properly address the issue stemming from memory indexing, we need to analyze the intended operations of the source code. For instance, some keyboard character mapping routines use table lookups, and thus tag propagation should be performed in this case to avoid false-negatives for key-logging malware. However, in some cases a table lookup result would provide a sanitized value that does not need to be tagged. Since this disclosure focuses on the case where only the application binary is readily accessible and no source code is available, we do not take into account the memory indexing issue, assuming that no information flows from the index to the destination.

Timing:

we can gather information about a certain operation without direct data copying, just by measuring the amount of time taken for the operation. Consider the following example:

```
const int x = 1;
send_value(adversary_site, x);
y = ...sensitive...
... // delay loop
... // time propotional to y
send_value(adversary_site, x);
```

In this example, the adversary can gain information about y by measuring the time difference between the two send_value operations, even though only a constant value x is sent to the adversary. Ideally, a correct IFT scheme should be able to catch this with a tag assignment of tag(x)←tag(y).

Termination and Exception:

besides normal program execution, abnormal program execution can also be leveraged to gain information about the state of a program. Consider the following example:

```
for (i = 0; i < MAX; i++) {
    if (i == secret) {
        throw_exception( );
    }
    printf("x");
}
```

Assuming that the secret value is 5 and that MAX is larger than 5, then the execution of this particular example will output "xxxxx before the program terminates with the exception (throw_exception( )). Although the print statement is not dependent on the secret value and thus does not contain information related to the secret value, the occurrence of the exception changed this assumption by terminating the execution before the end of the program.

Other Covert- and Side-Channels:

besides the methods of gathering information without direct data copying as described, there are several other ways to gain information indirectly about certain operations in a computer system. Our listing is not exhaustive and, as new technology evolves, new side-channels will be exploited to convey information implicitly. Examples of other side-channels include probabilistic, resource exhaustion, and power side-channels.

Information Flow Through Conditional Execution

Addressing implicit information flows stemming from memory indexing, timing or other side-channels, typically requires higher-level knowledge of the program semantics, thereby requiring access to the program's source code. In this disclosure, we deal with third-party application binaries, focusing on the case of the condition flag in the implicit information flow, as it occurs most often in legitimate code, e.g., format conversion, and is prevalent in document editing programs. Although it is one of the most common cases of implicit information flow, it is difficult to correctly track using IFT schemes.

The following code snippet shows a simple example of implicit information flow through the condition flag dependency of a program: x:=y:=1 s<=0 x:=0 y:=0 There clearly is a flow of information from the variable s to x; however, it is not the result of direct data copying, but the result of affecting the branch outcome by setting the condition flag through the comparison. For this particular example, an IFT scheme may have the tag assignment tag(x)←tag(s) when s≤0 and tag(y)←tag(s) when s>0. However, if we look closely, we can conclude that both tag assignments for x and y should always be performed, no matter the value of s, since observing the value of either x or y would reveal information about the assignment that did not occur, and we can use this information to reveal whether s is not a positive number, or a positive number. Before we describe our proposed solutions to address this kind of implicit information flow, we look at various prior IFT schemes to understand what is needed for a practical information flow tracking system.

Mitigation Techniques for Practical Dynamic Information Flow Tracking

Disclosed are hardware or hybrid mitigation techniques to address the issues of false-positives (FPs) and false-negatives (FNs) of the DIFT system and descriptions of their concept and implementation. More particularly, the confidentiality aspects of the DIFT system are explained, and the techniques presented to address implicit information flow and the FPs and FNs due to control dependencies. In order to track control dependencies dynamically, we first establish a baseline DIFT system (e.g., as shown in FIG. 9) with such a capability to reduce FNs arising from control flow dependencies.

We first describe how the information flow problem is solved using static information flow tracking. We then see whether or not we can adopt the same technique dynamically. Consider the conditional control flow in the following based on a sensitive condition s:

if s<=0 then x:=0 else y:=0

Language-based static information flow tracking techniques solve this problem by introducing the concept of the program counter tag, denoted Tpc, which indicates the information that can be learned by knowing the control flow path that has been taken in the program. In the case of the above example, since the taken path depends on the value of the variable s, the Tpc in the then and else clauses will inherit the label of s. If the source code of the program was available, this can be more easily achieved by the compiler performing the static analysis; thus the program would contain no illegal information flow if it passes the compilation.

We can apply the same technique to dynamic information flow tracking to track information across conditional execution. Suppose we have Tpc that gets the tag of s dynamically and every instruction takes into account the value of Tpc in addition to the tags of the source registers or memory locations. We will be able to correctly capture the information flow from s to either x or y, even though they are assigned a constant value in either path. Unfortunately, without knowing the scope of the branch instruction dynamically, false positives will be generated. A false positive (FP) is defined as the variable or memory location that is tagged while it contains no information related to the source tagged data. A false negative (FN) is defined as the variable or memory location that is not tagged while it does contain information related to the source tagged data. This may arise depending on when the Tpc is cleared. In this particular example, the scope of the branch can be easily determined to be the first common instruction that is executed when either path is taken. In other words, we clear the Tpc after the if then else statement ends. However, the issue can be complicated by nested if statements and loops, which would make the scope determination more difficult. A naive DIFT system that tracks control dependency might tag every instruction that is executed after the tagged branch, thus leading to an unusable system with a large amount of false positives.

Tunable Propagation Tracking for Control Dependency

We now propose a simple mitigation technique for reducing the amount of false positives in the naive DIFT system, by utilizing a count-down counter Tpc_CNT that counts from a maximum value, FLOW_MAX, to zero, to determine when to clear the Tpc. The counter value is set to the maximum value whenever there is a branch instruction that sets the Tpc to a non-zero value, indicating a tagged conditional execution. Tpc_CNT decreases by one after each instruction is executed when the counter value is greater than zero and Tpc is reset (set to zero) when the counter Tpc_CNT reaches zero. Tpc_CNT does not go below zero. The process starts again when the program's execution reaches another tagged branch instruction. We call Tpc_CNT the propagation counter since it determines how much information is propagated due to a tagged branch instruction. From a different perspective, clearing the Tpc_CNT can be described as declassification in the program, since clearing the Tpc essentially declassifies the sensitivity of the data that are operated upon by the instruction.

This propagation counter technique requires adding one 32-bit count-down counter to the baseline architecture and one 32-bit register to store the value of FLOW_MAX.

Using Static Analysis to Reduce False Positives

The simple tunable propagation technique described in the previous section requires the appropriate setting for the FLOW_MAX value for a particular application. However, this is often a very hard decision to make since setting the value too low would create false negatives that eventually leak information, and setting the value too high would create false positives just like in the naive DIFT system.

Figure 12:
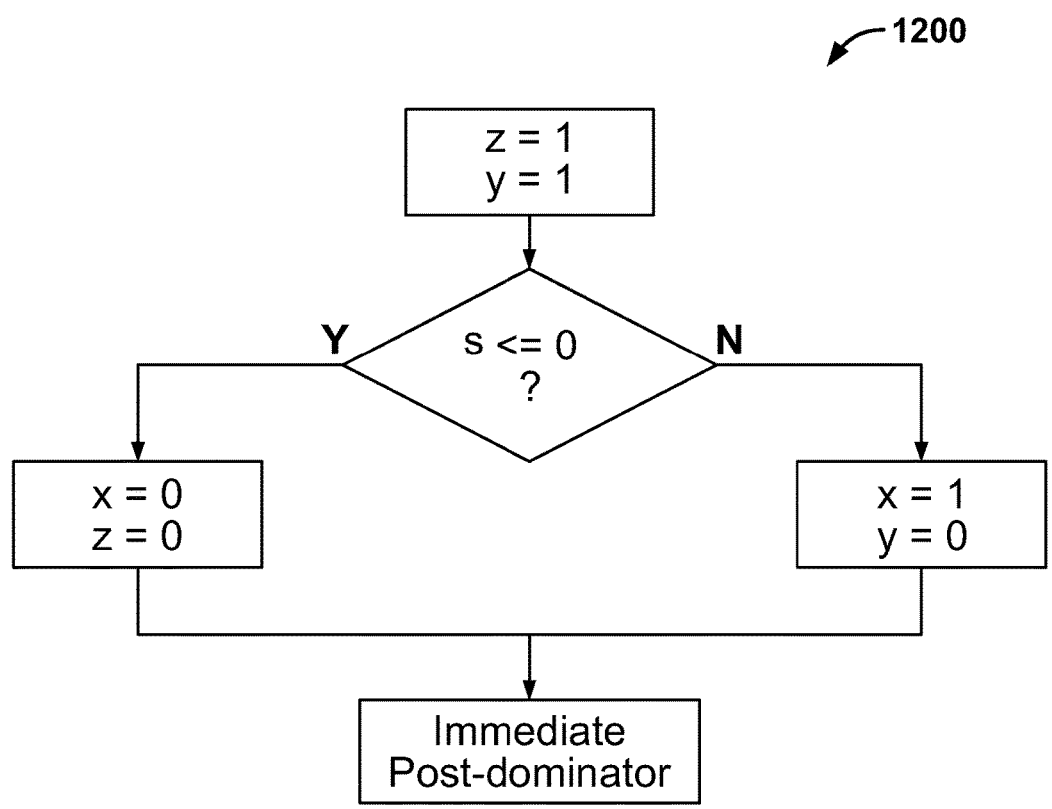
FIG. 12 is a control flow graph (CFG) of a conditional execution example.

Since it is difficult to determine the optimal FLOW_MAX value dynamically, we resort to static techniques that can assist the DIFT system in determining the optimal value. For this section, we look at a similar conditional execution example as before but slightly more complicated to see how static analysis can help a naive DIFT system.

z:=1; y:=1;
IF s<=0 THEN x:=0; z:=0; ELSE x:=1; y:=0;

FIG. 12 is a control flow graph (CFG) of this conditional executional example. A node p post-dominates a node a if all paths to the exit node of the graph starting at a must go through p. From the control flow graph 1200, we can determine that the information should flow and be tracked from the tagged branch block s<=0 until the start of its immediate post-dominator block, where declassification should happen. Intuitively this means that we are allowing the Tpc to affect only the instructions that are control-dependent on the tagged branch but nothing more. In practice, this static analysis can help the tunable propagation in two ways. The first one is to run the static analysis to figure out the appropriate FLOW_MAX value for each potentially tagged branch instruction and insert an extra instruction before the branch instruction to set the FLOW_MAX value, in order to guide the DIFT system to reduce the amount of false positives. An alternative implementation is to set the FLOW_MAX value to a large enough value that fits the desired security requirement, run the static analysis and insert an instruction at the start of the immediate post-dominator block to clear the Tpc. This implies that now we do not have to determine the optimal value of FLOW_MAX, but can set the FLOW_MAX arbitrarily while reducing false positives due to tagged conditional branches.

In practice, clearing out the Tpc at the immediate post-dominator block only works for a single level of tagged branch. To account for potentially nested levels of tagged branches, a Tpc stack is employed to push the old Tpc value at the tagged branch block. We will describe FIG. 39 which shows an algorithm for inserting pushes and pops into this Tpc stack. Complications due to loops are also illustrated with FIG. 13 and FIG. 14.

Since nested branches may share the same post-dominator block, we insert empty blocks to make sure that each tagged branch block has a unique immediate post dominator block (line 3 of the algorithm shown in FIG. 39). Lines 4 to 6 shows the loop-peeling process to prevent the Tpc stack from being out-of-sync due to the first iteration of a loop. Additionally, to handle loops that may reach the same node again before reaching the post-dominator block of a tagged branch, our algorithm detects if the same node is visited again and inserts a pop operation right before the code reaches the same node (lines 11 to 15 of the algorithm shown in FIG. 39). These mechanisms ensure that each push operation has a corresponding pop operation. The algorithm shown in FIG. 39 sketches out the static binary analysis and instrumentation. Note that this type of static analysis can be done on the program binary, and does not need the source code.

Figure 13:
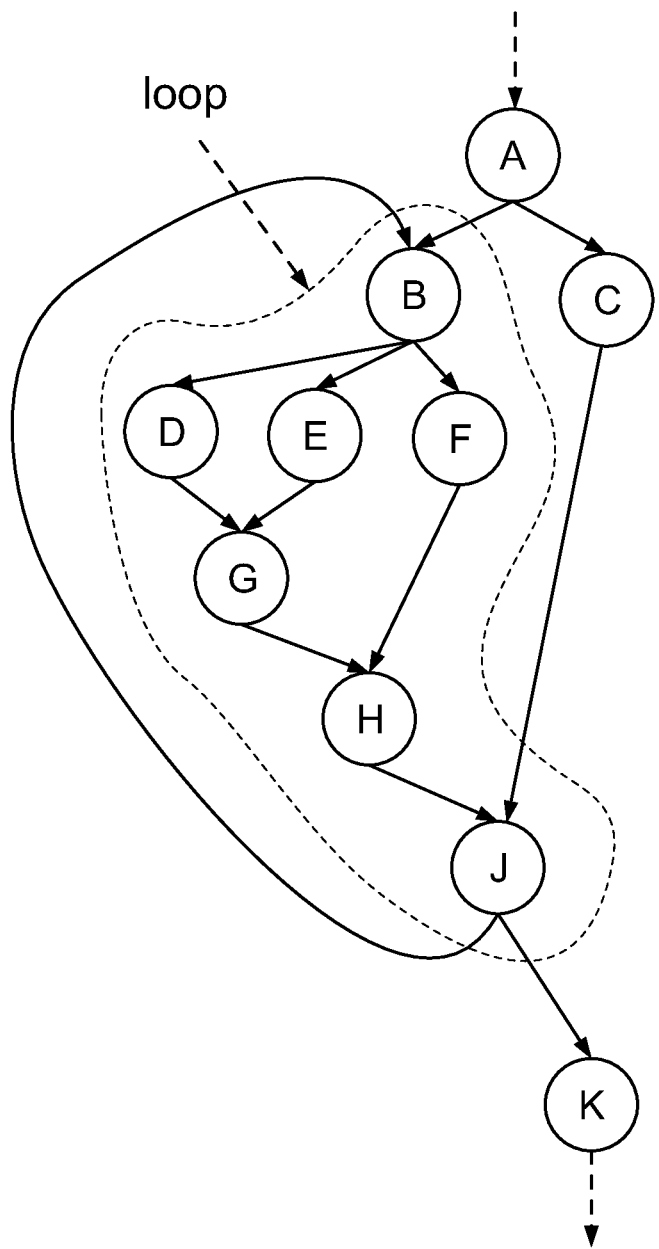
FIG. 13 is an example control flow graph to illustrate loop peeling of an algorithm that is used to reduce false positives due to tagged branches.
Figure 14:
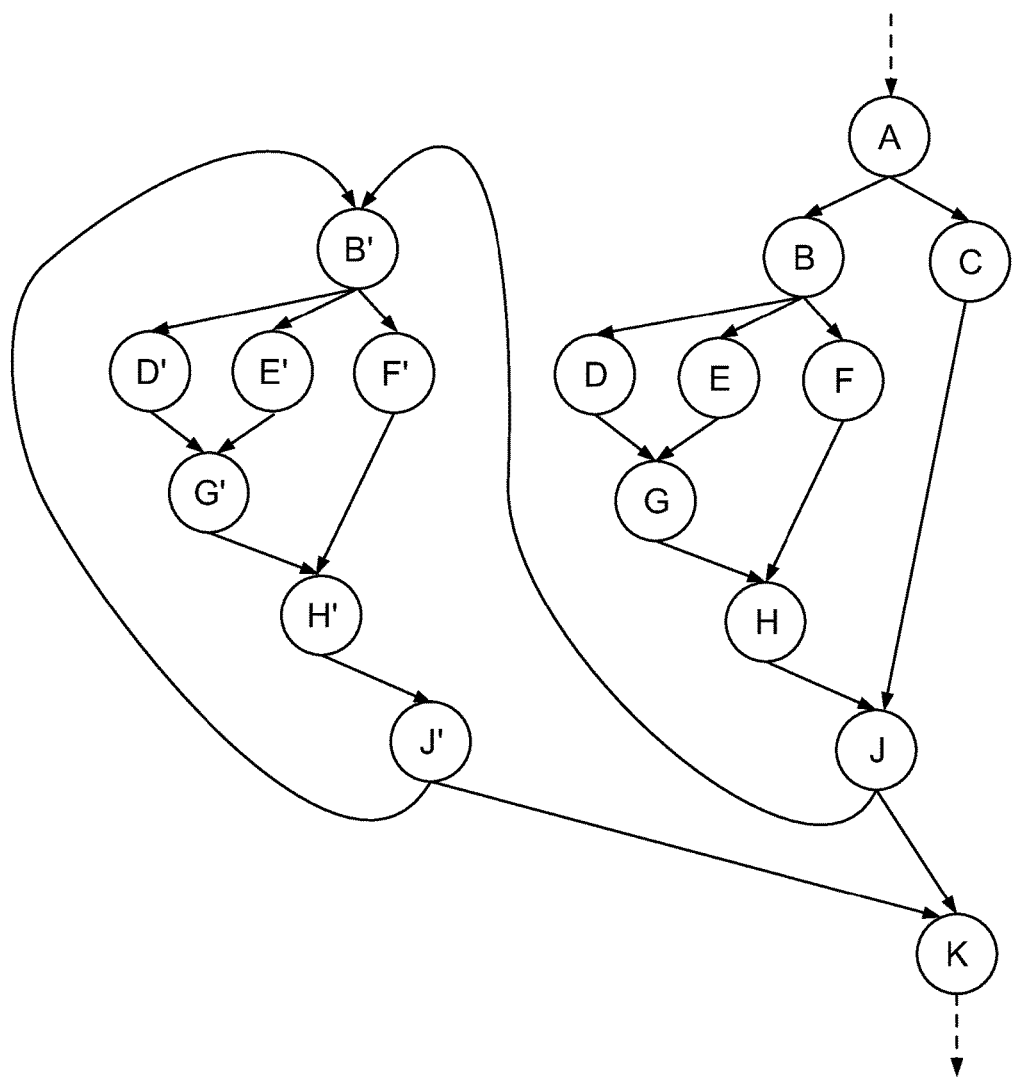
FIG. 14 is a modified control flow graph after the loop peeling of FIG. 13 is performed.

FIGS. 13-14 provide an example for the loop peeling process in the algorithm shown in FIG. 39 (lines 4 to 6). The loop peeling process is necessary to correctly match the number of pushes and pops of the Tpc stack, such that the stack is not out-of-sync with the program control flow. An example control flow graph is shown in FIG. 13 with a loop in between node B and J. Loop peeling works by first duplicating all the nodes and edges within the loop, nodes B' to J' in FIG. 14. Then the loop back edge from J to B is diverted to B', and the exit edge from J' to K is added for the peeled loop.

A primary purpose of loop peeling is to distinguish between the first loop iteration and the rest of the iterations. Taking the tagged branch block A in FIG. 13, for example, A's immediate post dominator block J is within the loop. If we perform the algorithm shown in FIG. 39 without the loop peeling part, we would instrument the program to push the Tpc at block A and pop the Tpc before the block J (at lines 10 and 16, respectively). However, since J is within the loop, there will be many more pops that do not have corresponding pushes, causing the stack to be out-of-sync with the program's execution. After the loop peeling, A's immediate post dominator block J, is now not in the loop and only executed once, so there will only be a single pop for the push of Tpc in block A.

As another example, we focus on the block J in FIG. 13. If we perform the algorithm shown in FIG. 39 without the loop peeling part, we would push the Tpc at block J and insert a corresponding pop before reaching J in each path leading back to J, i.e., H to J. However, if we consider the first time the loop is entered, the pop operation actually happens before the push at block J, leading to an out-of-sync Tpc stack. Therefore, by breaking the loop for the first loop iteration using loop peeling, we would insert the pop in the path H' to J' instead, so the pushes and pops for the first iteration of the loop will not result in a out-of-sync Tpc stack.

Using Static Analysis to Reduce False Negatives with Untaken Paths

Another issue remains even though a near optimal value of FLOW_MAX can be determined. Reference is made back to the code example used in the previous section. Suppose we use the DIFT scheme in a Multi-Level Security (MLS) system where x has no security tag, s and y are tagged HIGH while z is LOW, and we want to prevent information flowing from HIGH to LOW. When s is less than or equal to zero, a violation would be detected since information flow from s to z is not allowed. However, when s is greater than zero, no violation occurs. Nevertheless, an adversary can still gain information about the value of s just by observing the value of z, since z was assigned a value 1 before the if statement. This problem stems from the fact that only one path of the program is taken dynamically, so the Tpc does not affect the tag of the variables that are supposed to be modified by the path that was not taken. To solve this problem dynamically, we would need to compensate for the tag assignments in the untaken path, as shown in FIG. 15.

Figure 15:
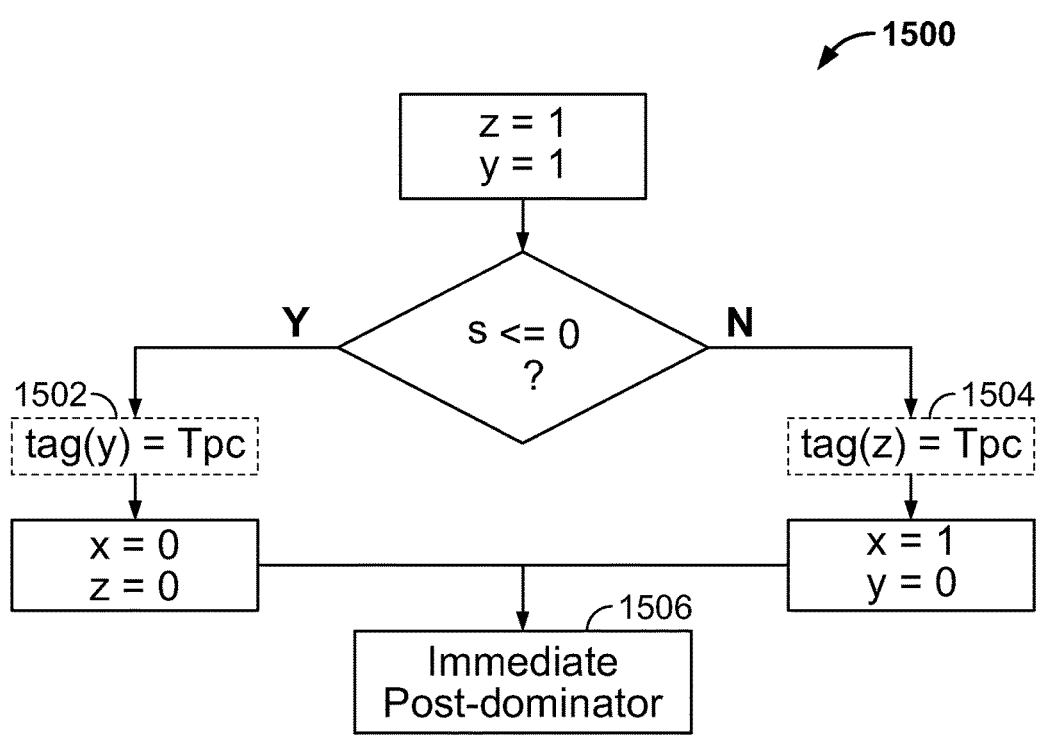
FIG. 15 is an instrumented control flow graph of the conditional execution example shown in FIG. 12 after compensation for tag assignments.

FIG. 15 is a flowchart 1500 showing the tag assignment compensations that account for the untaken path. For the left path, we insert the tag assignment (at block 1502) for y such that although the y=0 statement is not executed, we can still ensure that the implicit information flow is tracked dynamically. For the right path, we insert a tag assignment (at block 1504) for z such that although z=0 is not executed, we can still ensure that the implicit information flow is tracked dynamically. To enhance the algorithm shown in FIG. 39, to achieve the effect of FIG. 15, we need to identify the variables or memory locations that are changed between the tagged branch block and its immediate post-dominator block 1506. This set of variable and memory locations can be identified using standard compiler analysis and we omit the details here.

The algorithm shown in FIG. 40 assigns proper tag assignments to the variables for the untaken path. succ[n] denotes the successor blocks of n. These extra tag assignments are inserted for each path, since each path may have touched a different set of variables. We only need to find the variables that are live at the immediate post dominator block and have been assigned different values in between the tagged branch block and the post dominator block vset, since data that is not live will not be able to leak any information, and data that is not changed between the tagged branch block and the post dominator block does not carry any information regarding the tagged branch. Since during program execution, variables that are assigned a value between the tagged branch block and the post dominator block cset will already be tagged with the Tpc, we do not need to duplicate their tag assignment. Although the algorithm may insert some redundant tag assignments, late phase of compiler optimizations, such as dead code and redundancy eliminations, will clean up the code. It addresses the issues of false-positives and false-negatives for implicit information flows due to conditional execution and the untaken path.

Nevertheless, there is a limitation regarding live memory locations. If the address of the live memory location can be determined statically, the algorithm can instrument the proper tag assignment for the untaken branch. If the address cannot be determined or not all of the target memory locations can be identified statically, we need some high-level program information to help guide the static analysis about the potential live memory addresses, e.g., by annotating the base and bounds of a table used in a table lookup.

Reducing False Positives by Save/Restore

The main issue of a DIFT system is false positives, which we address using the tunable propagation counter and analysis and instrumentation from static analysis. Both of the techniques are simply addressing the false positives stemming from within an application. However, once false positives have found their way into the operating system, the false positives grow very quickly across different operating system modules and would render the DIFT system unusable due to the sheer amount of false positives.

We propose a solution that further reduces the amount of the false positives in the entire system by leveraging system characteristics. We propose saving and restoring the register file tags whenever the processor changes its privilege level. In other words, if the execution of the userspace program is interrupted, we propose that before the control is transferred to the operating system for asynchronous interrupts, the DIFT hardware automatically saves the register file tags and then zeroes out the current register file tags, so no unnecessary tagged values are accidentally propagated to the operating system. Before the user space program resumes execution, the DIFT hardware would restore the register file tags. Note that the register file tags are only saved and restored when the userspace program is interrupted asynchronously. In other words, for synchronous privilege level changes such as system calls, the hardware save/restore of the register file tags is not triggered. This allows the DIFT system to continue tracking information across privilege level boundaries to avoid false negatives.

Implementation and Evaluation

We describe our prototype implementations of the four proposed mitigation techniques and evaluate their overhead and performance in terms of their false positives and false negatives. Too many false positives can result in less security, since the DIFT protection system may be turned off temporarily to get real work done—and then one may forget to turn it back on. Of course, allowing false negatives implies the system is not always preventing leaks. Hence, reducing false positives can translate to real-world practicality and usability while minimizing false negatives is necessary for security.

Our baseline DIFT architecture is implemented on the OpenSPARC open source processor simulator. We have modified the stock OpenSPARC T1 processor to track all explicit information flows.

FIG. 36 lists the propagation rules for the baseline DIFT architecture as well as the tunable propagation employed in our implementation. In FIG. 36, bold fonts indicate rules specific for the tunable propagation. The capital T denotes the tags. The rules in parentheses are implemented depending on the specific instruction that either operates differently according to the condition code register, affects the condition code register or uses the y register. ccr refers to the condition code register in the SPARC architecture. Ty is the tag for the y register, Tccr denotes the tag for the condition code register, and similarly for the source registers (src1 or src2) and the destination register, dest. For the Integer arithmetic instructions, the tunable propagation technique adds the Tpc term to each propagation rule. For load and store instructions, T[src] refers to the tag of the memory location pointed by src, and likewise for T[dest]. The memory indexing implicit information flows, discussed in Section 1.2, are shown in parentheses for the load and store instructions and it depends on the implementation to turn on/off for the tracking of memory indexing.

We wanted a program that has a pre-existing implicit information flow situation that we could use to show how well our mitigation techniques work. Also the program needs to be small for efficiency, yet realistic for our simulator. We wanted a program that goes through both userspace and the operating system. We found a program that calculates the digits of π, and uses conditional branches to determine how to format the printing of these digits. If we mark the initial values of π as confidential data, then the π program has an implicit information flow based on a sensitive condition used in a conditional branch instruction, and does go from userspace to OS space and back. To see how the mitigation techniques work to improve the practicality of the DIFT system, we illustrate with a π-calculation program that calculates 1000 decimals of π. Although the program is not security-critical, the program does contain implicit information flow due to conditional execution.

FIG. 16 shows a simplified version of the z program, to illustrate the effect of implicit information flows. This example π-calculation program starts with an array src[ ] with 337 elements, all of which we tag as sensitive variables. The tags propagate to variable q, which is a function F( ) of src[ ] and other untagged data. These then propagate to other calculations, e.g., H( ), which is shown in FIG. 17. Note that the function G( ) does not contain a sensitive condition, since both k and j are non sensitive. At the end of the calculations, the array dst[ ] is written with ASCII characters corresponding to the calculations derived from src[ ]. One of the character conversion functions contains a conditional branch that depends on a tagged value, as shown by the number variable in FIG. 18. In the π example, the tagged value to be used as the number in sprintf( ) is the taint variable in line 5 of FIG. 16.

We will show that there is an inadvertent implicit information flow in this little program, hidden in the sprintf( ) library call. We first describe the working of this program. The seemingly complex program can be interpreted as two nested loops and an sprintf( ) function to print ASCII characters to the dst[ ] array. Looking at the program more closely, we can deduce that at least the following variables or memory locations should ideally be tagged as sensitive when the program finishes execution: (1) the entire array src[ ], the original tag source, (2) 64-bit variable q, since q is assigned to a value that depends on the values in src[ ] (line 3), (3) the first 1001 bytes (1001/8≈126 64-bit words) of dst[ ], since they get assigned based on the variable taint which is based on some function of both the tagged src[ ] and tagged q (line 5), and (4) the 64-bit variable n, since it depends on the actual number of characters printed by sprintf( ) which depends on the value of taint (line 5). n is equal to 1001 at the end of the execution.

The core of the sprintf( ) function is a while loop that extracts the remainder of the division of the integer argument (number in FIG. 18) by 10. The while loop keeps executing as long as the quotient is greater than zero, and the quotient is used as the dividend in the next loop iteration. The extracted remainders are then used to lookup the corresponding characters to print. We show the disassembled SPARC assembly instructions for the core of the sprintf( ) function in FIG. 19.

FIG. 19 shows the disassembled SPARC assembly instructions for the core function of sprintf( ) in FIG. 18. Line 39-41 checks for the condition in the outer while loop. Line 5-18 calculate number and digit. Line 21-28 test digit for the sensitive switch statement and line 31-38 assign the value for character.

Figure 20:
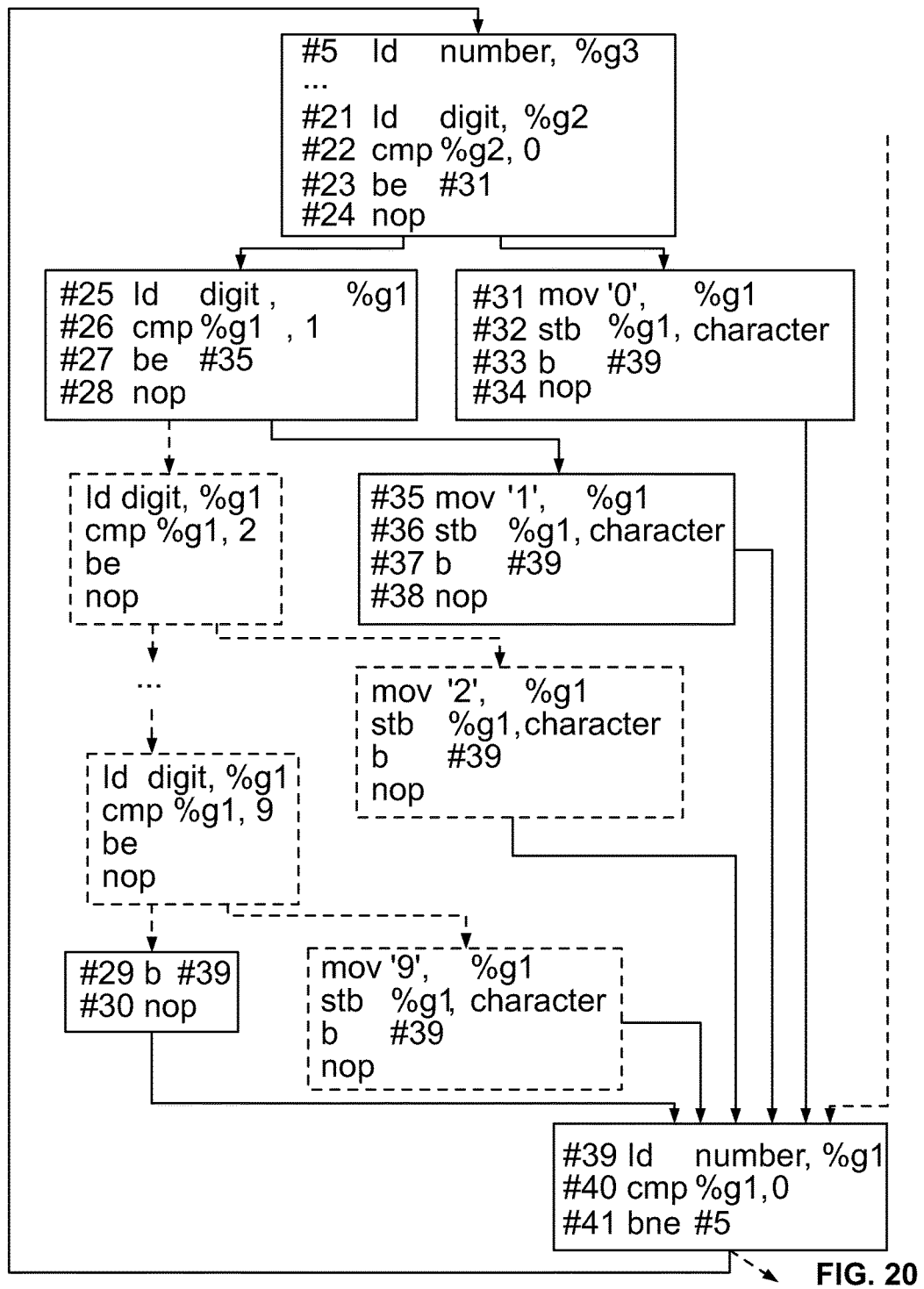
FIG. 20 is a control flow graph of a function shown in FIG. 18.

FIG. 20 shows the control flow graph of the core function of sprintf( ). Each block has its corresponding line numbers from FIG. 19. Note that in this particular example, an ideal FLOW_MAX value would be 3, to cover the sequence of nop, move and stb instructions after the tagged branches (be) in line 23 and 27.

Looking more closely at the assembly instructions in FIG. 19 shows that the compare instructions (cmp) at lines 22 and 26, thar sets the tag of the condition code register (Tccr), since register % g2 contains a sensitive data digit. The subsequent branch-if-equal instruction be propagates the tag from the condition code register to the tag of the program counter (Tpc). Therefore the instructions executed after the branches (line 31-34, and 35-38, respectively) will carry the tag value of digit. If this implicit information flow is not tracked by the DIFT system, the store-byte instruction (stb) at lines 32 and 36 will not be tagged, resulting in false negatives. The corresponding control flow graph of the assembly code of FIG. 19 is shown in FIG. 20, with each block showing their line numbers in FIG. 19. Note that the implicit information flow from the outer while loop actually does not matter since there is explicit information flow from number to digit.

Note particularly that in this program, the dst[ ] array will only get tagged through implicit information flow since sprintf( ) prints out the decimal characters based on comparisons of the integer arguments. In summary, a perfect DIFT system would tag a total of (337+1+126+1=) 465 64-bit words, including the original tag source src[ ]. The actual number may be a little higher due to some temporary variables used in the library function sprintf( ).

To establish bounds for comparison with our mitigation techniques, we first look at how the baseline DIFT system which is not tracking control dependency, and the DIFT system which tags everything after the tagged branch instruction perform, using this π-calculation example program. Before the start of every experiment, we clear all the leftover tags in the system, and we initialize the tags for the sensitive data (src[ ] in the π-calculation program). We let the program run until completion and then take a snapshot of the system to count the number of memory locations that are tagged. The granularity of the tags is one tag per 64-bit word. In other words, we consider the memory location as tagged even if only one byte within the 64-bit word is tagged.

FIG. 37 shows false positive (FP) and false negative (FN) performances of DIFT systems with implicit informal flow support. Lines 2 and 3 show the lower and upper bounds given by the baseline DIFT (no tracking for control dependency) and the naïve DIFT system (constant tracking for control dependency), for running the π-calculation program. Each experiment is repeated 10 times and the average values are reported. We pick the zero-false-negative and balanced values from the FLOW_MAX technique when FLOW_MAX is equal to 4 and 3, respectively. (see FIG. 22) and the register file tags save/restore technique when FLOW_MAX is equal to 5 (see FIG. 25).

Basically the baseline DIFT system and the naïve DIFT system set up the lower and upper bounds for the false positives and false negatives performance of our mitigation techniques. The second and third rows of FIG. 37 summarize the results for the baseline and naive DIFT system. The baseline DIFT system does not track control dependencies, resulting in the entire dst[ ] array being untagged; whereas the naïve DIFT system, although exhibiting no false-negatives, produces more than 6× the number of tagged words when comparing to the ideal or perfect DIFT system with 465 tagged words, shown in the first row of FIG. 37. The next four rows show the performance of the mitigation techniques we propose, which we discuss below.

Tunable Propagation

Figure 21:
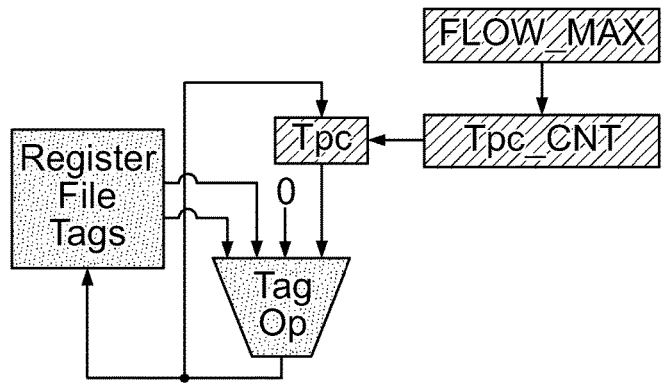
FIG. 21 shows additional components for implementing tunable propogation for control dependency.

We first describe the implementation and cost for the tunable propagation for control dependency. As pointed out above, this mitigation technique requires one additional count-down counter and two additional registers to store the values of FLOW_MAX and Tpc. FIG. 21 depicts the additional components needed for this mitigation technique and its connections to the baseline DIFT system.

Figure 22:
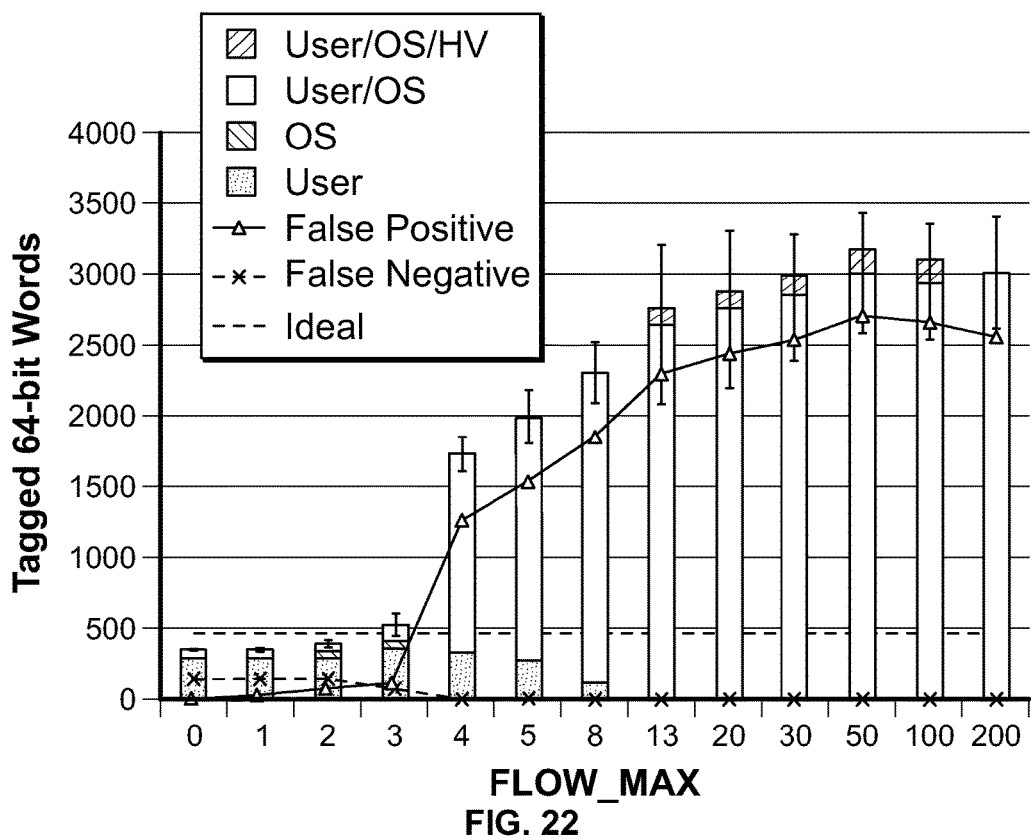
FIG. 22 is a graph showing false positives and false negatives analysis after running a disclosed calculation program.

FIG. 22 shows the false positives and false negatives analysis of running the π-calculation program using the tunable FLOW_MAX technique. The columns represent the number of tagged (non-zero tag value) words when FLOW_MAX is set to the values on the x-axis. The dashed line in FIG. 22 represents the expected number of tagged 64-bit words in the system that would be achieved by an ideal DIFT system, which is 465 as described previously. In other words, we can expect false-negatives if the total tagged words in the system are below this number and false-positives otherwise.

The bars for the total tagged words in FIG. 22 are further broken down into different categories that indicate which level of the software hierarchy is responsible for writing to the tagged memory location. For example, "OS" means that the operating system wrote to that memory location with tagged data and "User/OS" means that both the userspace programs and the operating system have written tagged data to the same memory location.

Figure 25:
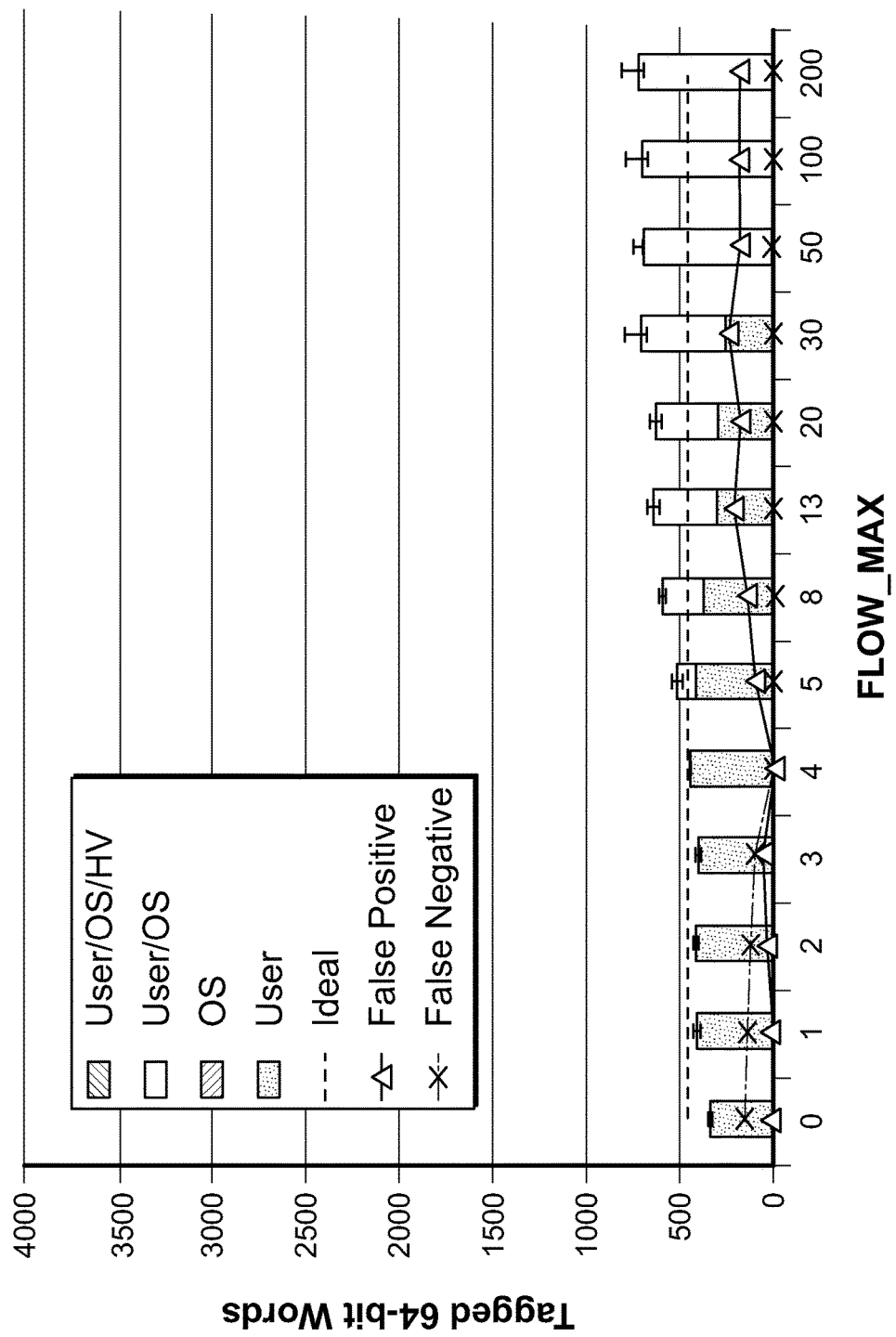
FIG. 25 is a graph showing false positives and false negatives analysis after running the disclosed calculation program, with a register file tags save/restore mechanism.

FIG. 25 shows the false positives and false negatives analysis after running the π-calculation program. The contributions from the hypervisor (HV), User/HV and OS/HV are all zeroes and not plotted on the graph. The x-axis denotes different settings of the FLOW_MAX values and the y-axis shows the number of tagged 64-bit words in the system. Note that the x-axis is not in linear scale.

FIG. 22 shows that for this particular program, the setting of FLOW_MAX=3 gives good balance between false-positives (20%) and false negatives (9%), if the system permits leakage of information below a certain threshold. When FLOW_MAX is set to 4 or greater, there are no more false-negatives, but false-positives begin to rise sharply (5th and 4th rows of FIG. 37), and continues to increase until it stabilizes at around 3000 tagged words. Note that most of the increase in false positives is for words touched by both the user and the OS, indicating more reductions of false-positives can be achieved by analyzing the OS-contributing factor and employing OS-specific tag clearing techniques, which we will discuss in more detail below. At large FLOW_MAX values, the false-positives is about six times more than the ideal value, which would render the system impractical, since users would most likely turn off any security feature that annoys them too often or simply click yes whenever there is a security warning. Therefore, it is very important to determine the value for FLOW_MAX to ensure maximum security (no false negatives) with minimal interruptions (small false positives). Depending on the security and usability requirements of the system, the value of FLOW_MAX can be correspondingly adjusted.

Static Binary Analysis and Instrumentation

The binary analysis can be implemented on the BitBlaze platform. Applying the algorithm shown in FIG. 40 to the π-calculation program and running the program on the same hardware DIFT infrastructure gives the total tagged 64-bit words of 485 which includes 20 false-positives and no false-negatives, compared to the ideal value of 465. This shows that with the assistance of static binary analysis, we can achieve a practical information flow tracking system with no false-negatives and a low false-positive percentage of 4.3%, for this particular program (FIG. 37).

Although no source code is needed since the analysis is done on binaries, this technique requires doing a pre-execution static analysis and adding instructions to the executable binary code. The advantage though is that there need be no guessing of the value of FLOW_MAX, since it is set to cover the scope of the sensitive conditional, and the variables on the untaken path are also tagged sensitive when necessary. Covering the scope is necessary for "soundness" since the application program could be interrupted for an arbitrary number of instructions, and FLOW_MAX could count down to zero executing OS instructions, before execution returns to the application program. Without this immediate post-dominator scoping, there could be false negatives. The same scoping technique also prevents unnecessary false positives when guessing to set the FLOW_MAX to a large number for high security—since the clearing of Tpc and setting FLOW_MAX back to zero at the immediate post-dominator, also reduces unnecessary propagation beyond the scope of the tagged conditional. Covering the untaken path is necessary to ensure no false negatives for dynamic implicit information flow tracking, where only one path of a conditional branch can be taken during execution.

Supposing we do not want to modify the execution binaries, as required in this statically-informed mitigation technique, the analysis above suggests that we compare with our tag register save/restore technique.

Tag Register Save/Restore

If we analyze the trend given in FIG. 22, we see that as the FLOW_MAX value increases, the amount of tagged value contribution from the operating system significantly increases as well. This is due to the fact that once false positives have entered the memory space of the operating system, they propagate further among other operating system components as well. We took one of the runs of our experiment and instrumented the simulation to keep a record of the program counters (PC) within the operating system that contributed to the tagged values and cross referenced the PC addresses with the operating system functions to figure out which modules of the operating system are the major contributors and which modules are the "entry points" of these tagged values into the rest of the operating system. Our analysis is done on the Ubuntu 7.10 with a Linux kernel version of 2.6.22-15-sparc64.

Figure 23:
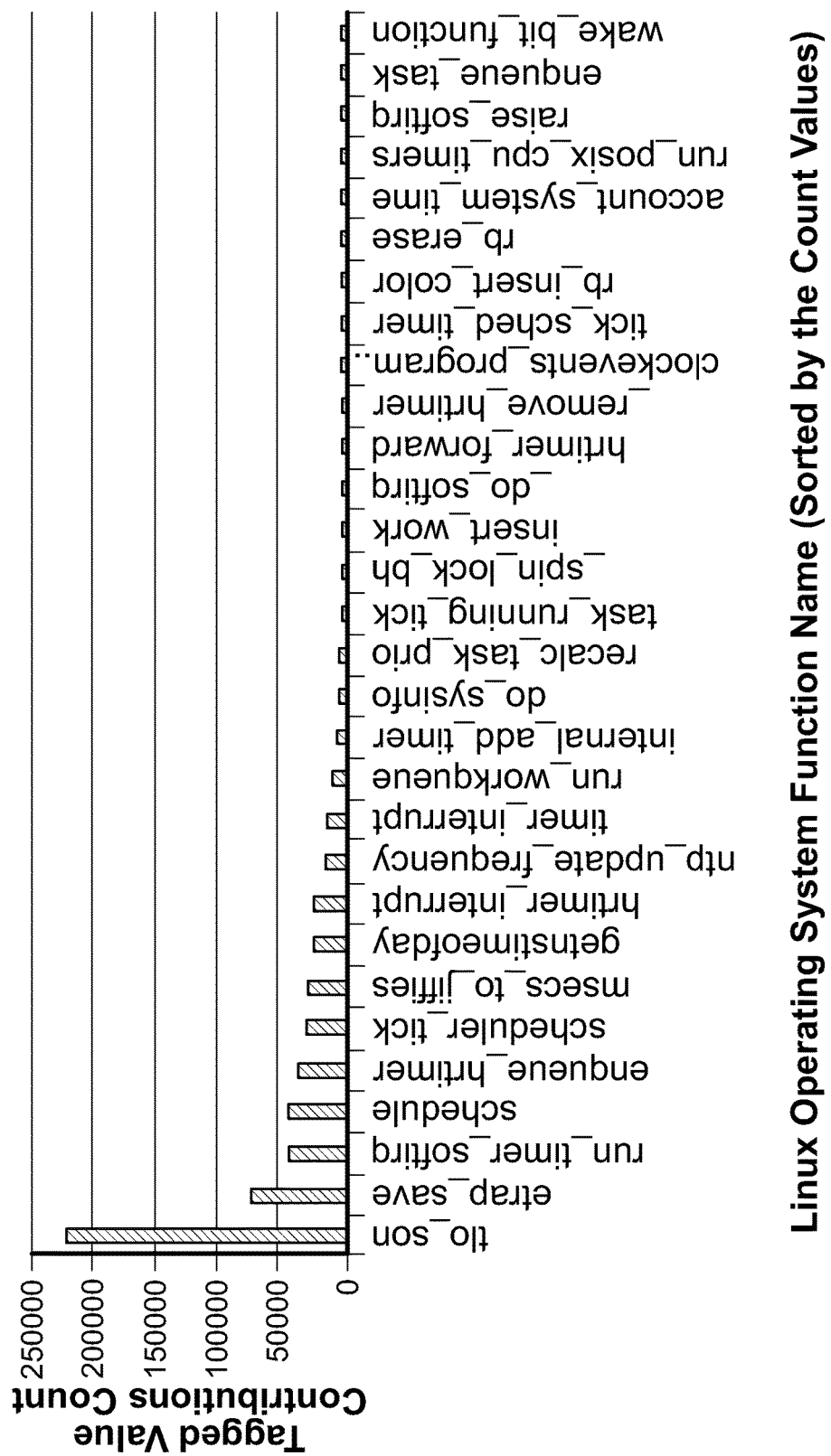
FIG. 23 is a graph showing Linux operating system functions that contribute to the tagged values in the disclosed system.

FIG. 23 shows the Linux operating system functions that contribute to the tagged values in the system. Each write of a tagged 64-bit word to the memory by the operating system is counted as one contribution. The list is sorted by the amount of contribution from the various operating system functions. More specifically, FIG. 23 shows the distribution of the functions within the operating system that actually contribute to the total tagged values in the system and we find that the top 10 contributing functions within the OS cover more than 75% of the total tagged values within the system. We then look further into the details of these top 10 functions, as listed in FIG. 36 with their contribution percentage and a brief description of their functions within the operating system. From the table we gather that tagged values escape from the userspace into the OS space through three main avenues: (1) register spill/fill routines, (2) trap save routine for preparing the entry into the kernel and (3) timer interrupt routines.

FIG. 38 provides a brief descriptions of the top 10 operating system functions with the highest tagged value contributions, along with their corresponding frequency of occurrences represented as the percentage of the total aggregate count.

These three main avenues belong to the asynchronous privilege level change category, since they are mainly caused by program side-effects, e.g., page faults or limited amount of hardware register windows. We implement the register file tags save/restore to save the values of the register file tags and zero the tags before the control is transferred to these routines. Subsequently when these routines finish execution and before the control is transferred back to the interrupted application, the hardware save/restore mechanism then restores the register file tags for the particular application, in a similar fashion to a context switch.

Figure 24:
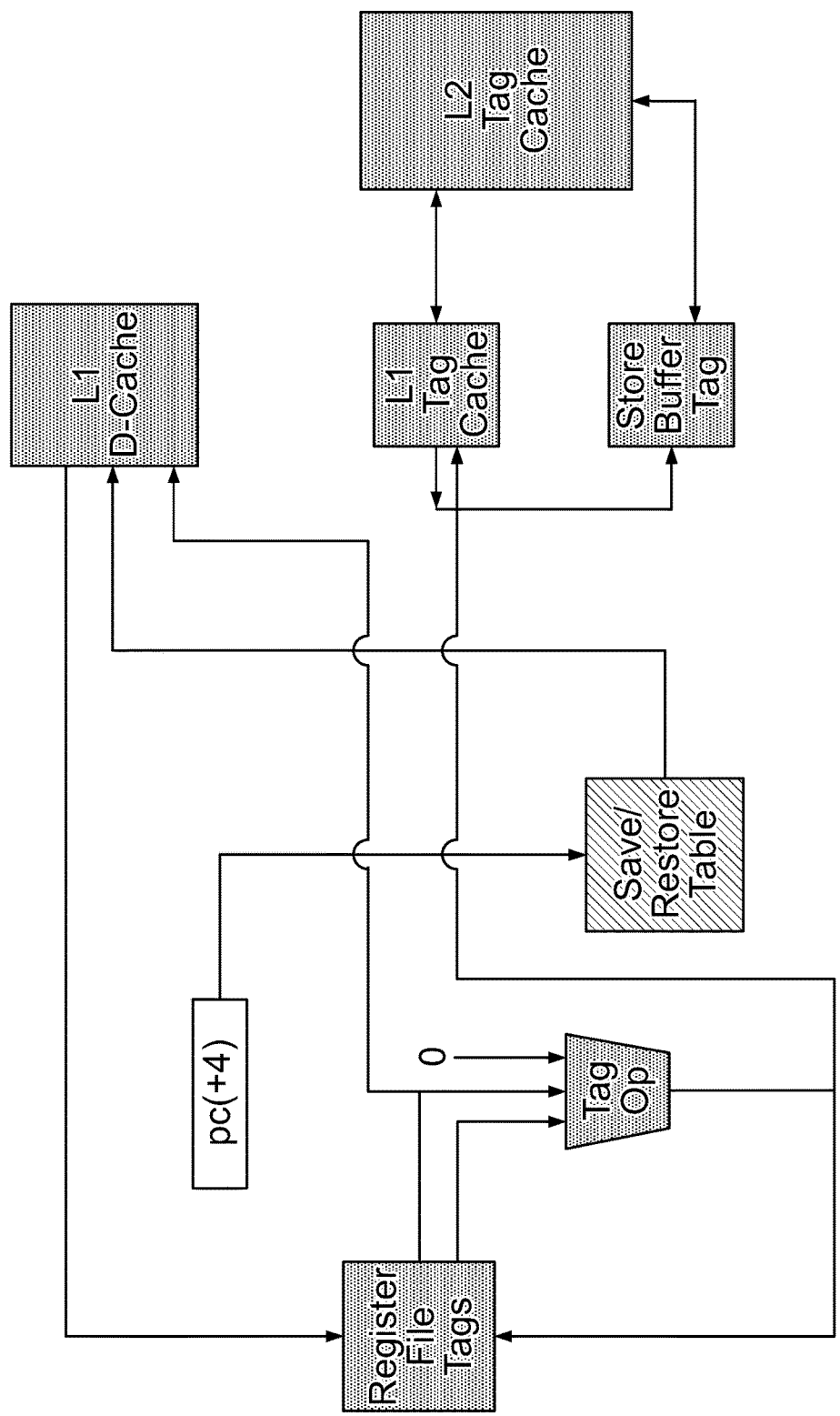
FIG. 24 shows additional components for supporting register file tags save/restore functionality.

FIG. 24 shows additional DIFT components for register file tags save/restore (in stripes) to address tag pollution in the OS space. More particularly, FIG. 24 depicts the additional components needed to perform register file tags save/restore on top of the baseline DIFT system. We use the program counter (pc) to look up the Save/Restore table that points to the memory location pre-assigned to save the register file tags. The value of pc or pc+4 is used depending on whether or not the interrupted instruction is re-executed or not. Likewise, the table is looked up by the hardware to find the saved register file tags when the values are restored upon resuming the application program.

FIG. 25 shows False positives and false negatives analysis after running the $\pi$-calculation program, with the register file tags save/restore mechanism. Note again that the x-axis is not in linear scale. To show the effectiveness of reducing the amount of false positives in the system by the register file tags save/restore mitigation technique, we combine the tunable propagation mechanism with the save/restore mechanism and run the same $\pi$-calculation program. FIG. 25 shows the same statistics collected as shown before in FIG. 22. We can see the reduction of total tagged words by nearly 4×, when compared to the DIFT (tunable propagation). This greatly increases the practicality and usability of the simple tunable propagation technique, without requiring any static analysis, and instrumentation additions to the application binary.

DIFT and DataSafe Architecture

Tracing the assembly instructions and the control flow graph of the core function of sprintf( ) that exhibits implicit information flow shows that our proposed mechanisms is able to track these implicit information flows correctly, without any false-negatives. We now complete the picture by showing how the DataSafe architecture can prevent the tagged data from being output by the application.

The sprintf( ) function on line 5 in FIG. 16 writes the tagged bytes to the destination array (dst[ ]), which is ultimately written to the screen by the printf( ) function on line 6. The printf( ) function recognizes that it is writing a string of bytes, and calls the write(1, dst, len) system call, where len denotes the length of the string. In our $\pi$ program example, the length of the string is 1001, the number of digits of the calculation. Since this system call is a synchronous system call, the save/restore mechanism will not be triggered and the tag of the destination buffer dst will propagate into the operating system space. In the operating system, the write system call copies the tagged data in the dst buffer and writes them to the memory location that is mapped to the frame buffer of the display device. The DataSafe hardware's output control circuitry will check the tag value of the data to see if the data is allowed to be copied to the frame buffer of the display (mapped in memory range 0x1F10000000 to 0x1F10000050 in our 64-bit Legion simulation infrastructure) and disallow the data copy if the policy prohibits it. Note also that our implicit information flow mechanisms enable tag propagation across applications, library and the operating system (the $\pi$-program, sprintf( ) library function, and the write( ) system call), thus confirming that DataSafe's hardware tracking transcends program and system boundaries.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A system comprising a physical memory and a processor, the processor including:
   a policy/domain handler configured to receive data and a policy associated with the data;
   tracking and output control hardware;
   a hypervisor; and a file management module configured to:
receive a request from a third-party application to interact with a data file containing the data; and
send an authorization and tag request to the policy/domain handler to generate hardware tags for the data file,
wherein, if the authorization succeeds and based on the tag request, the policy/domain handler generates the hardware tags for the data file, and
sends the hypervisor a request to create in the physical memory a secure data compartment containing the data file and the hardware tags, the hypervisor associating the hardware tags with each data unit in the secure data compartment, and
wherein the tracking and output control hardware tracks the hardware tags of each data unit to ensure that only actions in conformance with the policy are allowed.

2. The system of claim 1, wherein the hardware tags are associated with each word of data in the secure data compartment.

3. The system of claim 1, wherein the policy/domain handler generates the hardware tags based on the policy.

4. The system of claim 3, wherein the policy/domain handler generates the hardware tags based on a domain context, the domain context including at least one of session and/or user properties, data properties, or system and/or environment properties.

5. The system of claim 1, wherein the secure data compartment is created by associating the hardware tags with plaintext data in the physical memory.

6. The system of claim 1, wherein the third-party application is able to use the data without the system modifying the third-party application.

7. The system of claim 1, wherein the processor includes a plurality of policy/domain handlers, each of the plurality of policy/domain handlers being responsible for one of a plurality information domains.

8. The system of claim 1, wherein, after the third-party application processes the data, the hypervisor re-encrypts the data, removes the hardware tags from the secure data compartment, and deletes the secure data compartment.

9. A method performed by a system comprising a physical memory and a processor, the method including:
receiving data and a policy associated with the data;
intercepting a request from a third-party application to interact with a data file containing the data;
generating a plurality of hardware tags for each data unit in the data file based on the policy;
creating in the physical memory a secure data compartment for the data file and the plurality of hardware tags;
associating the protected data units with the plurality of hardware tags in the secure data compartment; and
tracking the plurality of hardware tags to ensure that only actions in conformance with the policy are allowed.

10. The method of claim 9, wherein associating the protected data comprises associating each word of the protected data with one of the plurality of hardware tags in the secured data compartment.

11. The method of claim 9, wherein creating the secure data compartment is performed by a hypervisor of the system.

12. The method of claim 9, wherein generating the plurality of hardware tags comprises generating the plurality of hardware tags based on a domain context, the domain context including at least one of session and/or user properties, data properties, or system and/or environment properties.

13. The method of claim 9, wherein creating the secure data compartment includes associating the hardware tags with plaintext data in the physical memory.

14. The method of claim 9, further comprising allowing the third-party application to use the data without modifying the third-party application.

15. The method of claim 9, wherein the generating of the plurality of hardware tags is performed by one of a plurality of policy/domain handlers, each of the plurality of policy/domain handlers being responsible for one of a plurality of information domains.

16. The method of claim 15, wherein one of the policy/domain handlers requests a hypervisor to create in the physical memory the secure data compartment and associate the protected data with the plurality of hardware tags in the secure data compartment.

17. A system comprising hardware that includes a physical memory and a processor, the processor including a software component that is configured to:
receive data and a policy associated with the data;
intercept requests from an application to interact with the data;
generate hardware tags for the data,
creating in the physical memory a secure data compartment for the data;
associate the hardware tags with the data in the physical memory, and
track the hardware tags to ensure that only actions in conformance with the policy are allowed.

18. The system of claim 17, wherein the hardware tags are generated based on the policy associated with the data.

19. The system of claim 17, wherein the application is unchanged.

20. The system of claim 17, wherein the hardware tracks and propagates the hardware tags associated with the data for every operation using the data to detect any explicit or implicit information flow from the data.

21. The system of claim 17, wherein the software component includes a policy/domain handler, a file management module and a hypervisor.

22. The system of claim 21, wherein the policy/domain handler generates the hardware tags based on the policy.

23. The system of claim 21, wherein the policy/domain handler generates the hardware tags based on a domain context, the domain context including at least one of session and/or user properties, data properties, or system and/or environment properties.

24. The system of claim 21, wherein the processor includes a plurality of policy/domain handlers, each of the plurality of policy/domain handlers being responsible for one of a plurality information domains.

25. The system of claim 17, wherein the hardware tags are associated with each word of data in a secure data compartment.

26. The system of claim 25, wherein the secure data compartment is created by associating the hardware tags with plaintext data in the physical memory.

27. The system of claim 25, wherein, after the application processes the data, the software components re-encrypts the data, removes the hardware tags from the secure data compartment, and deletes the secure data compartment.

28. The system of claim 17, wherein the application is able to use the data without the system modifying the application.

29. A method performed by a system comprising a physical memory and a processor, the method including:
receiving data and a policy associated with the data;

intercepting requests from an application to interact with the data;

generating a plurality of hardware tags for the data based on the policy;

associating in the physical memory the data with the hardware tags;

tracking and propagating the hardware tags when the data is used or operated upon; and preventing security breaches based on the hardware tags.

30. The method of claim 29, wherein associating the data comprises associating each word of the protected data with one of the plurality of hardware tags in a secured data compartment.

31. The method of claim 29, further comprising creating a secure data compartment in the physical memory.

32. The method of claim 31, wherein creating the secure data compartment includes associating the hardware tags with plaintext data in the physical memory.

33. The method of claim 29, wherein generating the plurality of hardware comprises generating the plurality of hardware tags based on a domain context, the domain context including at least one of session and/or user properties, data properties, or system and/or environment properties.

34. The method of claim 29, further comprising allowing the application to use the data without modifying the application.

35. The method of claim 29, wherein the generating of the plurality of hardware tags is performed by one of a plurality of policy/domain handlers, each of the plurality of policy/domain handlers being responsible for one of a plurality of information domains.

36. The method of claim 29, wherein one of the policy/domain handlers requests a hypervisor to create in the physical memory a secure data compartment and associate the protected data with the plurality of hardware tags in the secure data compartment.

* * * * *